(12) United States Patent
Kihara et al.

(10) Patent No.: US 11,372,018 B2
(45) Date of Patent: Jun. 28, 2022

(54) SENSOR UNIT, ELECTRONIC APPARATUS, AND MOVING OBJECT

(71) Applicant: Seiko Epson Corporation, Tokyo (JP)

(72) Inventors: Ryuji Kihara, Matsumoto (JP); Kentaro Yoda, Chino (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 17/104,354

(22) Filed: Nov. 25, 2020

(65) Prior Publication Data

US 2021/0165018 A1 Jun. 3, 2021

(30) Foreign Application Priority Data

Nov. 29, 2019 (JP) .............................. JP2019-216445
Jun. 26, 2020 (JP) .............................. JP2020-110249

(51) Int. Cl.
*G01P 15/08* (2006.01)
*G01P 1/00* (2006.01)
*G01P 1/02* (2006.01)

(52) U.S. Cl.
CPC .............. *G01P 15/08* (2013.01); *G01P 1/003* (2013.01); *G01P 1/02* (2013.01); *G01P 1/023* (2013.01)

(58) Field of Classification Search
CPC ...... G01P 15/0802; G01P 15/18; G01P 15/08; G01P 1/02; G01P 1/023; G01P 1/003
See application file for complete search history.

(56) References Cited

U.S. PATENT DOCUMENTS

| 5,150,616 | A | * | 9/1992 | Kondo | G01P 1/023 73/514.33 |
| 5,546,644 | A | * | 8/1996 | Kakizaki | G01P 1/023 29/25.35 |
| 6,182,508 | B1 | | 2/2001 | Takeuchi et al. | |
| 6,323,529 | B1 | * | 11/2001 | Nagahara | G01P 1/023 257/254 |
| 2001/0055836 | A1 | * | 12/2001 | Kunda | B81C 1/00333 438/108 |
| 2004/0119143 | A1 | * | 6/2004 | Karpman | G01P 1/023 257/618 |
| 2004/0238943 | A1 | * | 12/2004 | Fujii | G01P 15/125 257/704 |

(Continued)

FOREIGN PATENT DOCUMENTS

| JP | H10-153616 A | 6/1998 |
| JP | H11-006736 A | 1/1999 |

(Continued)

OTHER PUBLICATIONS

Momentive performance materials "Technical Data Sheet for TSE3051 Material"; Year 2007 (total 4 pages).

*Primary Examiner* — Helen C Kwok
(74) *Attorney, Agent, or Firm* — Harness, Dickey & Pierce, P.L.C.

(57) ABSTRACT

A sensor unit includes a substrate, an inertial sensor module mounted at the substrate, a container including a storage space for storing the substrate and the inertial sensor module, and a coupling member that couples the container and the substrate in a state in which the substrate and the container are in non-contact with each other. The coupling member has elasticity, and an elastic modulus of the coupling member is smaller than an elastic modulus of the container.

11 Claims, 16 Drawing Sheets

(56) References Cited

U.S. PATENT DOCUMENTS

| | | | | |
|---|---|---|---|---|
| 2005/0279166 A1* | 12/2005 | Shizuno | ............... | H01L 24/97 |
| | | | | 73/493 |
| 2006/0112766 A1* | 6/2006 | Ohta | ............... | G01P 1/006 |
| | | | | 73/526 |
| 2006/0255441 A1* | 11/2006 | Ohta | ............... | G01C 19/56 |
| | | | | 257/680 |
| 2009/0282915 A1* | 11/2009 | Ohta | ............... | B81B 7/0058 |
| | | | | 73/504.12 |
| 2010/0192689 A1* | 8/2010 | Ulm | ............... | G01C 19/56 |
| | | | | 73/430 |
| 2010/0242605 A1* | 9/2010 | Offterdinger | ............... | G01P 1/023 |
| | | | | 73/514.38 |
| 2011/0132089 A1* | 6/2011 | Jeong | ............... | G01P 15/125 |
| | | | | 73/514.32 |
| 2012/0312094 A1 | 12/2012 | Uchida et al. | | |
| 2013/0307094 A1* | 11/2013 | Yoshiuchi | ............... | G01P 1/023 |
| | | | | 257/415 |
| 2013/0319113 A1* | 12/2013 | Mizuta | ............... | G01P 1/023 |
| | | | | 73/493 |
| 2014/0055974 A1* | 2/2014 | Hansen | ............... | H05K 1/14 |
| | | | | 361/804 |
| 2017/0059605 A1* | 3/2017 | Saito | ............... | G01C 19/5783 |
| 2017/0191832 A1* | 7/2017 | Kinoshita | ............... | G01P 1/023 |
| 2020/0057088 A1* | 2/2020 | Lebron | ............... | G01P 1/02 |

FOREIGN PATENT DOCUMENTS

| | | |
|---|---|---|
| JP | 2011-085441 A | 4/2011 |
| JP | 2012-063243 A | 3/2012 |
| JP | 2015-001493 A | 1/2015 |
| JP | 2016-118421 A | 6/2016 |
| JP | 2016-130642 A | 7/2016 |

\* cited by examiner

SENSOR UNIT, ELECTRONIC APPARATUS, AND MOVING OBJECT

The present application is based on, and claims priority from JP Application Serial Number 2019-216445, filed Nov. 29, 2019 and JP Application Serial Number 2020-110249, filed Jun. 26, 2020, the disclosures of which are hereby incorporated by reference herein in their entireties.

BACKGROUND

1. Technical Field

The present disclosure relates to a sensor unit, an electronic apparatus, and a moving object.

2. Related Art

For example, in a sensor unit described in JP-A-2016-118421, a sensor module mounted with an inertial sensor is fixed to an outer case with a screw. Further, a flexible joining member is provided between the outer case and the sensor module, and the outer case and the sensor module are joined via this joining member.

However, in the sensor unit having such a configuration, since the sensor module is fixed to the outer case with the screw, noise vibration generated in the outer case is easily transmitted to the inertial sensor via the screw. Therefore, a detection characteristic of the sensor module may deteriorate.

SUMMARY

A sensor unit according to an aspect of the present disclosure includes: a substrate; an inertial sensor module mounted at the substrate; a container including a storage space for storing the substrate and the inertial sensor module; and a coupling member that couples the container and the substrate in a state in which the substrate and the container are in non-contact with each other, in which the coupling member has elasticity, and an elastic modulus of the coupling member is smaller than an elastic modulus of the container.

DESCRIPTION OF EXEMPLARY EMBODIMENTS

Hereinafter, a sensor unit, an electronic apparatus, and a moving object according to the present disclosure will be described in detail with reference to embodiments illustrated in the accompanying drawings.

First Embodiment

Figure 1A:
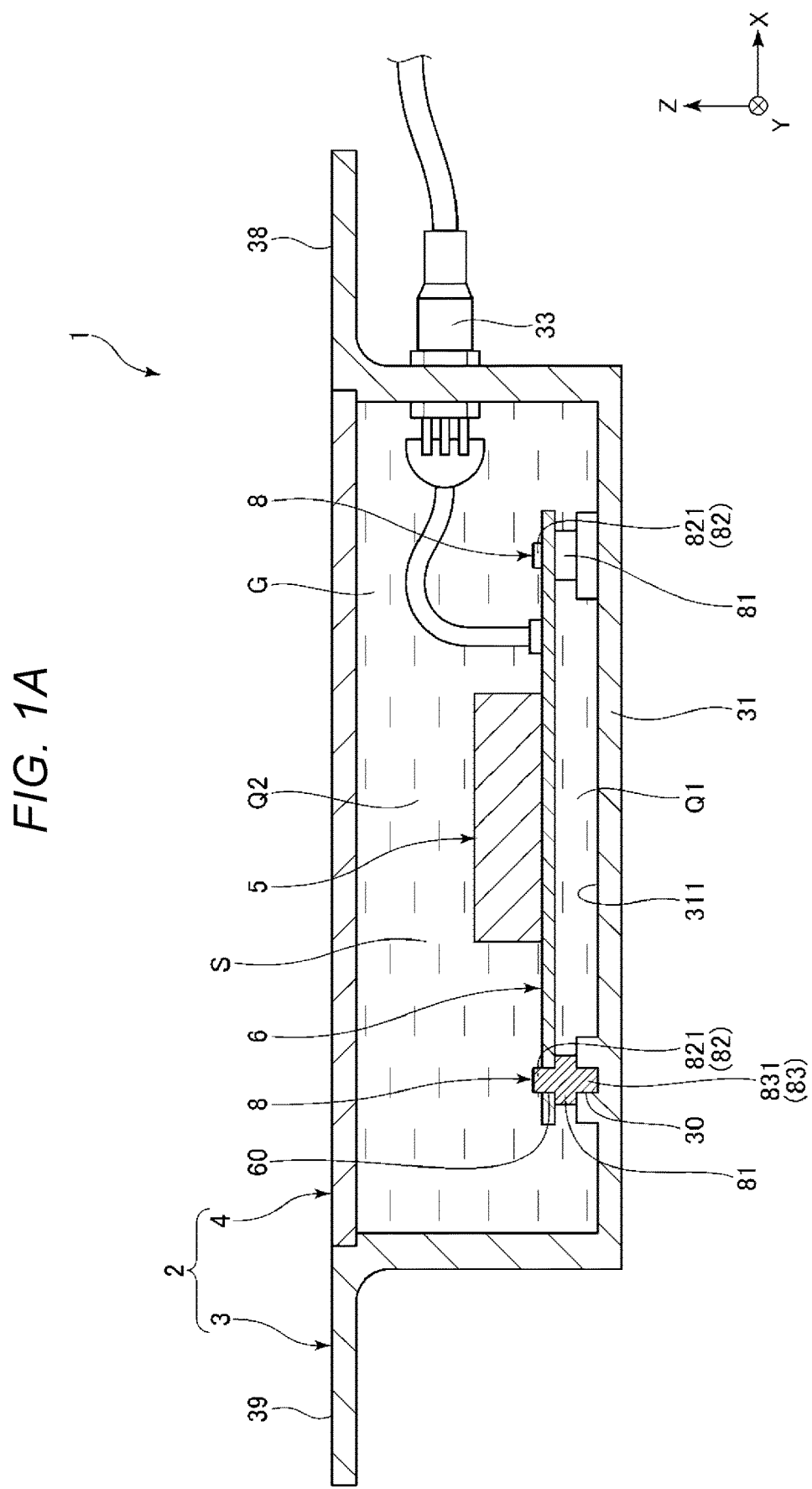
FIG. 1A is a cross-sectional view illustrating a sensor unit according to a first embodiment of the present disclosure.
Figure 1B:
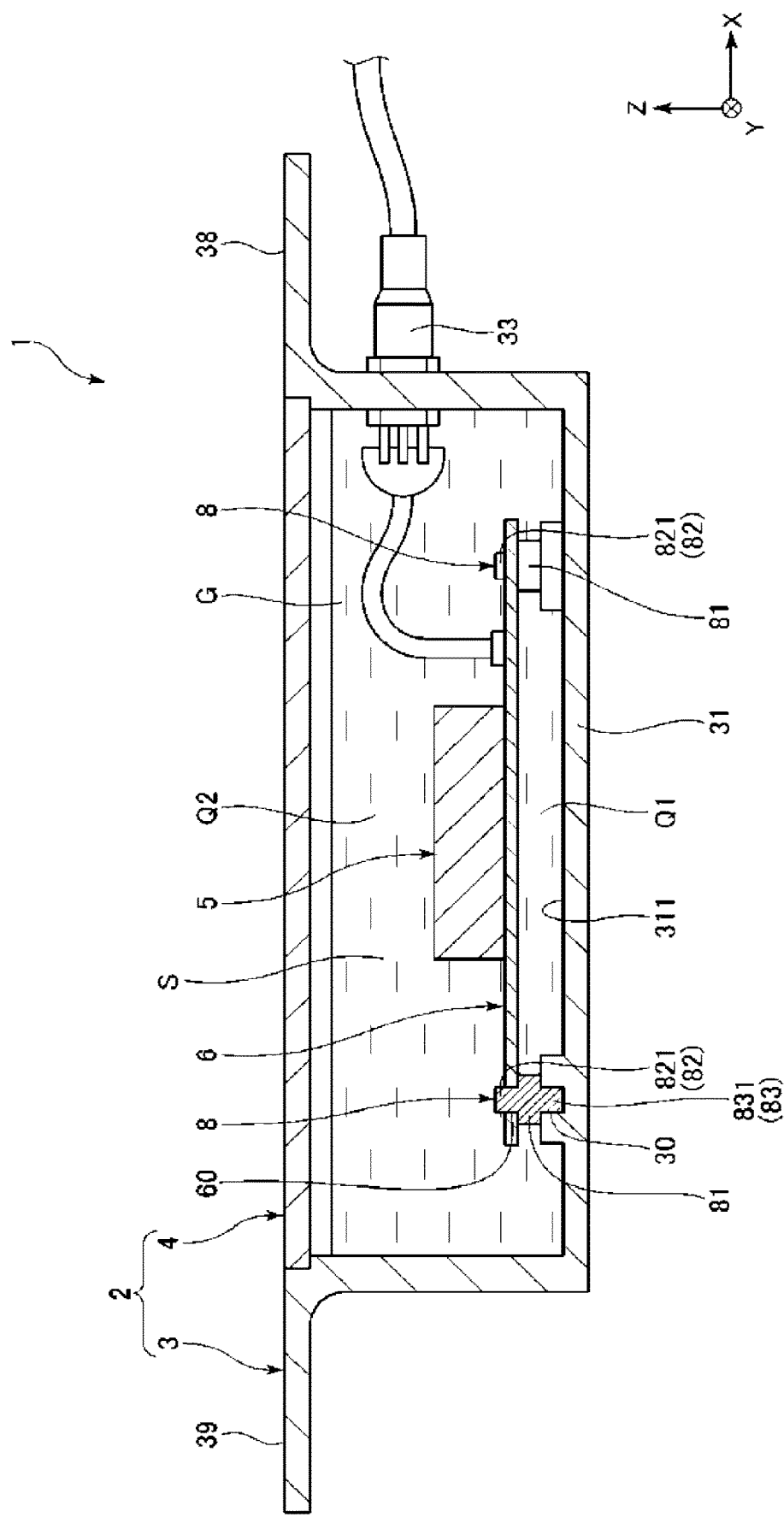
FIG. 1B is a cross-sectional view illustrating the sensor unit according to the first embodiment of the present disclosure.
Figure 2:
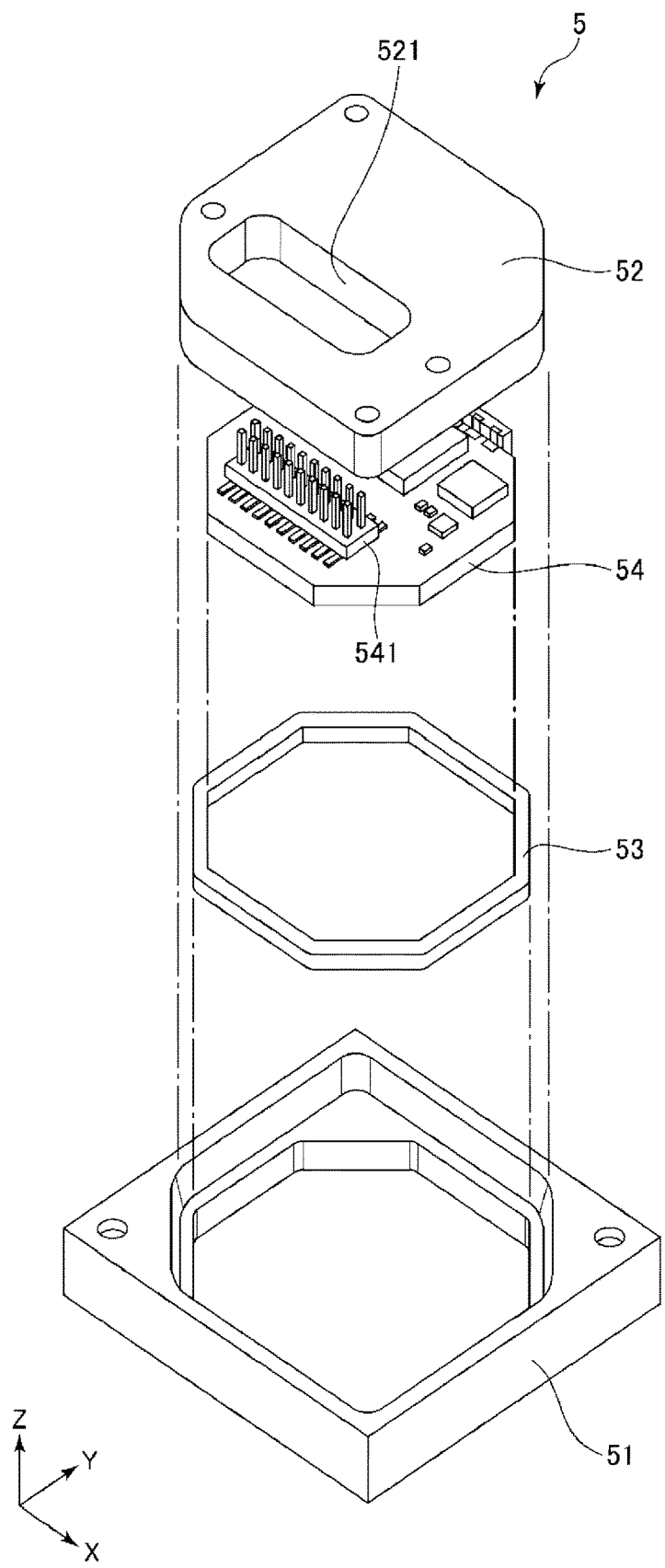
FIG. 2 is an exploded perspective view illustrating an inertial sensor module.
Figure 3:
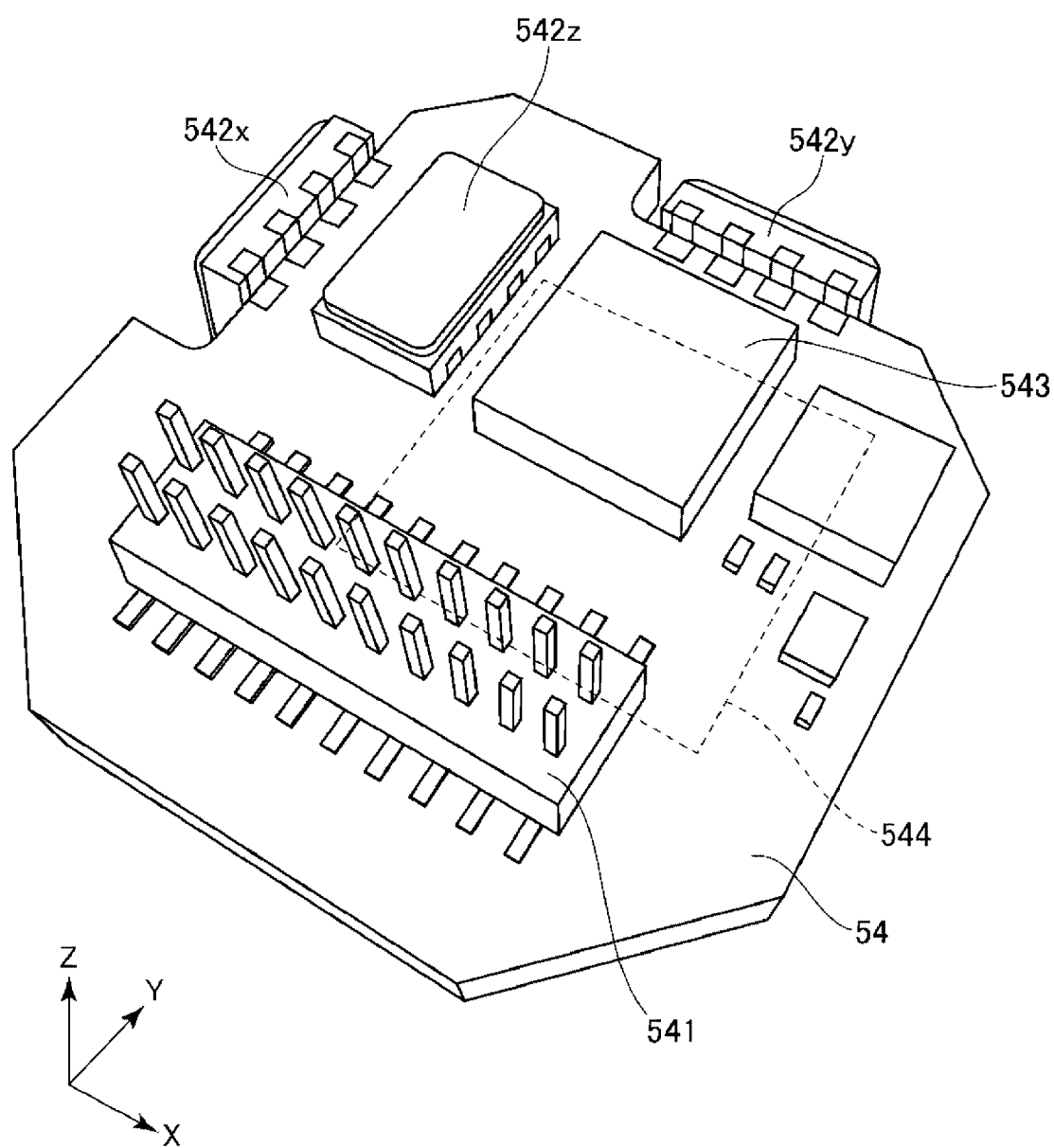
FIG. 3 is a perspective view illustrating a circuit substrate included in the inertial sensor module.
Figure 4:
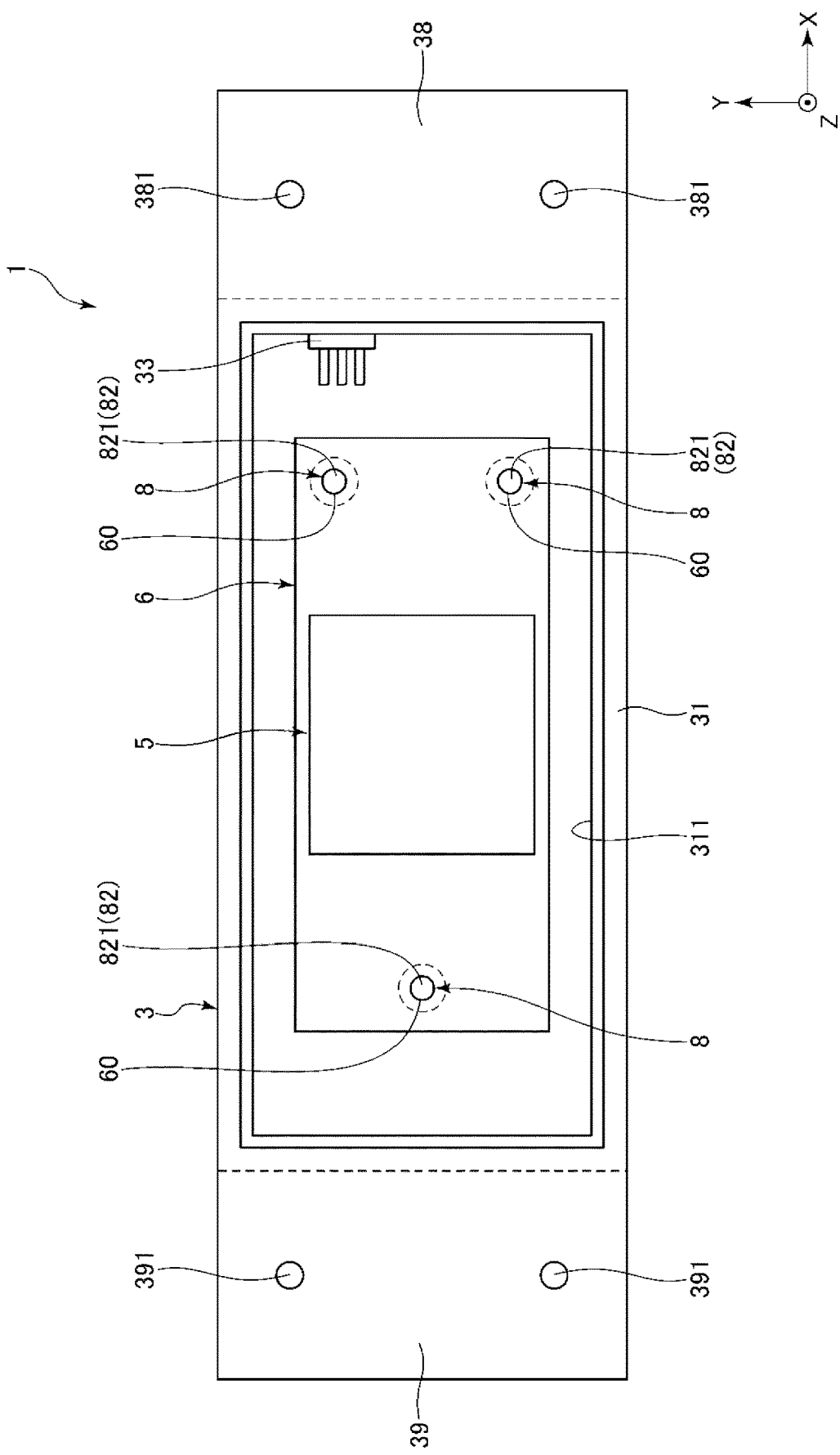
FIG. 4 is a plan view illustrating an inside of a storage space of the sensor unit.
Figure 5:
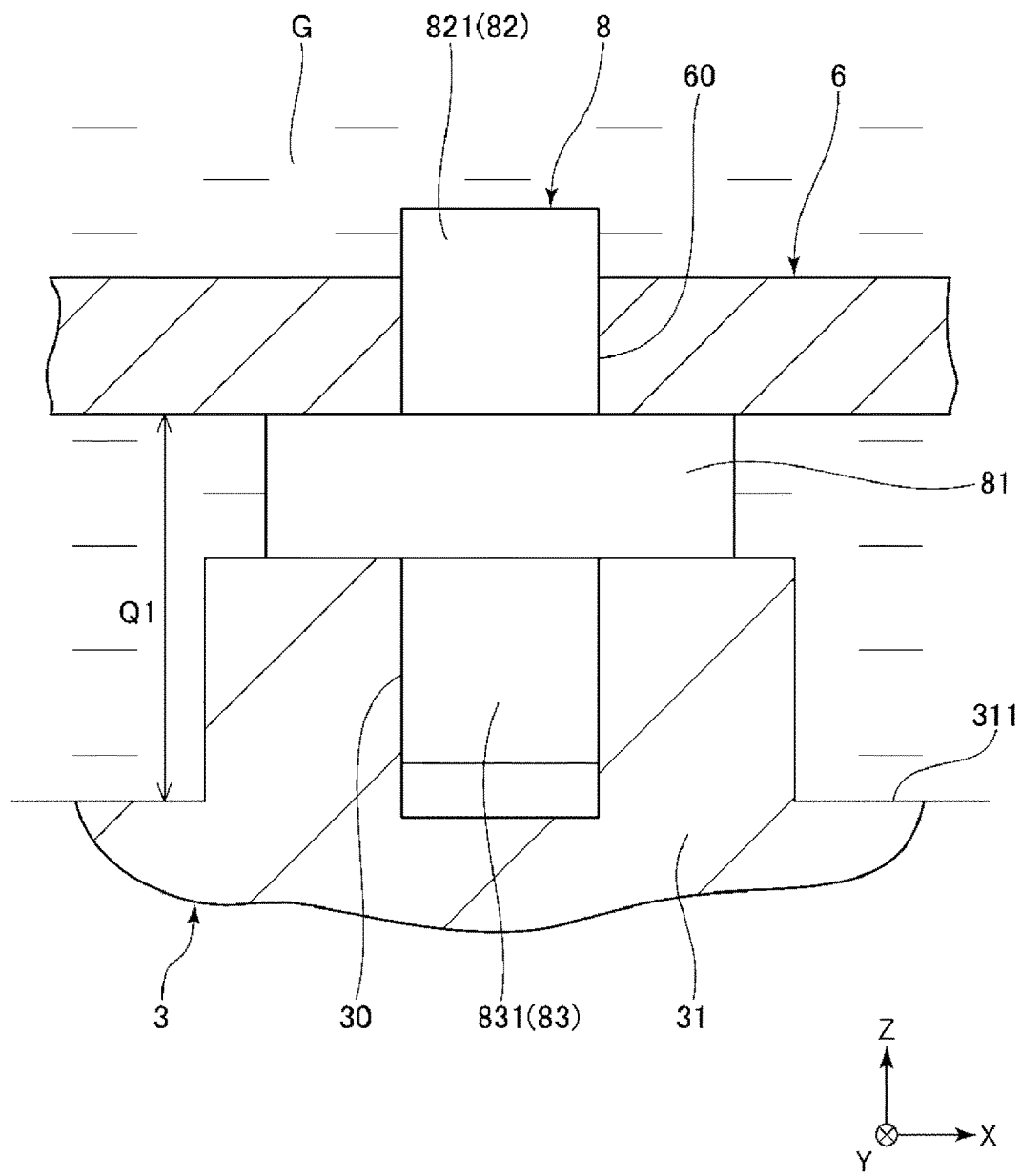
FIG. 5 is a cross-sectional view illustrating a coupling member.
Figure 10:
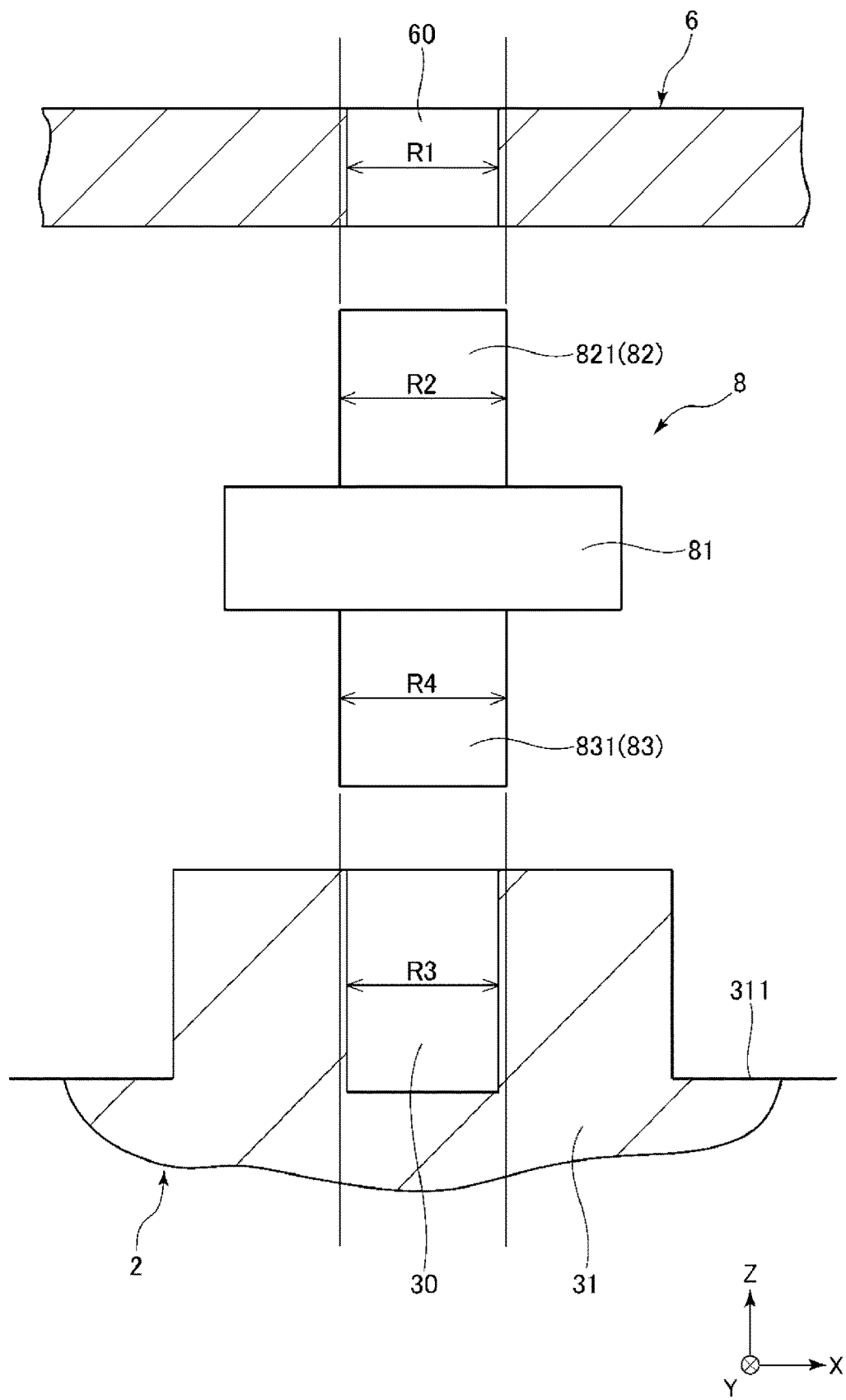
FIG. 10 is an exploded cross-sectional view illustrating the coupling member.

FIGS. 1A and 1B are cross-sectional views illustrating a sensor unit according to a first embodiment of the present disclosure. FIG. 2 is an exploded perspective view illustrating an inertial sensor module. FIG. 3 is a perspective view illustrating a circuit substrate included in the inertial sensor module. FIG. 4 is a plan view illustrating an inside of a storage space of the sensor unit. FIG. 5 is a cross-sectional view illustrating a coupling member. FIGS. 6 to 9 are perspective views respectively illustrating modification examples of the coupling member. FIG. 10 is an exploded cross-sectional view illustrating the coupling member.

For convenience of description, each of FIGS. 1A to 10 illustrates three axes, that is, an X-axis, a Y-axis, and a Z-axis which are orthogonal to each other. In addition, a direction along the X-axis is also referred to as an X-axis direction, a direction along the Y-axis is also referred to as a Y-axis direction, and a direction along the Z-axis is also referred to as a Z-axis direction. Further, a positive side in the Z-axis direction is also referred to as "upper" and a negative side in the Z-axis direction is also referred to as "lower". In addition, plan view from the Z-axis direction is also simply referred to as "plan view".

A sensor unit 1 illustrated in FIGS. 1A and 1B is an inertial measurement apparatus which detects a posture or behavior of a moving object such as an automobile, an agricultural machine, a construction machine, a robot, and a drone. The sensor unit 1 can function as a 6-axis motion sensor including an angular velocity sensor and a 3-axis acceleration sensor which measure a 3-axis angular velocity as an inertial sensor, and can function as a 3-axis motion sensor including an acceleration sensor which measures 3-axis acceleration. The sensor unit 1 is a rectangular parallelepiped having a rectangular shape in plan view, and has a size with a long side of approximately 120 mm along the X-axis direction, a short side of approximately 40 mm along the Y-axis direction, and a thickness of approximately 30 mm along the Z-axis direction. Meanwhile, the size of the sensor unit 1 is not particularly limited.

As illustrated in FIGS. 1A and 1B, the sensor unit 1 includes a container 2 having a storage space S inside the container 2, an inertial sensor module 5 and a substrate 6 stored in the storage space S, and a gel material G filled in the storage space S.

First, the inertial sensor module 5 will be described. As illustrated in FIG. 2, the inertial sensor module 5 has an outer case 51 and an inner case 52, and is configured so that the inner case 52 is inserted into the outer case 51 and the outer case 51 and the inner case 52 are joined by a joining member 53. Further, an opening 521 for exposing a connector 541 to be described below is formed at the inner case 52.

The inertial sensor module 5 has a circuit substrate 54 supported by the inner case 52 and stored between the outer case 51 and the inner case 52. As illustrated in FIG. 3, the connector 541 exposed from the opening 521, an angular velocity sensor 542x which measures an angular velocity around the X-axis, an angular velocity sensor 542y which measures an angular velocity around the Y-axis, an angular velocity sensor 542z which measures an angular velocity around the Z-axis, an acceleration sensor 543 which measures acceleration in each of the X-axis, Y-axis, and Z-axis directions, and a control IC 544 are mounted at the circuit substrate 54.

The control IC 544 is a Micro Controller Unit (MCU), and controls each portion of the inertial sensor module 5. A storage portion (not illustrated) in the control IC 544 stores a program which defines an order and a content for measuring acceleration and an angular velocity, a program which digitizes measured data and incorporates the data into packet data, or accompanying data. A plurality of electronic components are mounted at the circuit substrate 54.

Next, the substrate 6 will be described. The substrate 6 is a circuit substrate. As illustrated in FIGS. 1A and 1B, the substrate 6 is located below the inertial sensor module 5, that is, on the negative side in the Z-axis direction, and supports the inertial sensor module 5. Further, the substrate 6 is electrically coupled to the connector 541 of the inertial sensor module 5. The inertial sensor module 5 may be fixed to the substrate 6 only by coupling the connector 541, alternatively, for example, the inertial sensor module 5 may be screwed to the substrate 6 or bonded with an adhesive.

The substrate 6 includes a control circuit and an I/F circuit. The control circuit is, for example, a Micro Controller Unit (MCU), and includes a storage portion including a non-volatile memory, an A/D converter, and the like and controls each portion of the sensor unit 1. The I/F circuit has an interface function between the sensor unit 1 and another sensor or a circuit unit. Meanwhile, a configuration of the substrate 6 is not particularly limited, and for example, the I/F circuit may be stored in the storage space S as a substrate different from the substrate 6.

Next, the container 2 will be described. As illustrated in FIGS. 1A and 1B, the container 2 has a base 3 including a recess portion 311 which opens toward an upper surface and forms the storage space S, and a lid 4 fixed to the base 3 so as to close an opening of the recess portion 311. The inertial sensor module 5 is stored in the storage space S in a state of being supported by the substrate 6. Accordingly, it is possible to protect the inertial sensor module 5 and the substrate 6.

As illustrated in FIGS. 1A and 1B, the base 3 has a main body 31 and a pair of flanges 38 and 39 protruding from the main body 31 on both sides in the X-axis direction. The main body 31 has a longitudinal shape extending in the X-axis direction when seen from the Z-axis direction in plan view. Further, the main body 31 has the bottomed recess portion 311 which opens toward the upper surface. The inertial sensor module 5 described above is accommodated in the recess portion 311 in a state of being supported by the substrate 6. Further, the substrate 6 is installed at a bottom surface of the recess portion 311 via the three coupling members 8. Accordingly, the inertial sensor module 5 is fixed to the container 2, and unnecessary displacement of the inertial sensor module 5 inside the container 2 can be suppressed. Therefore, it is possible to suppress a decrease in detection accuracy of the inertial sensor module 5. The coupling member 8 will be described in detail below.

A connector 33 is attached to a side wall, located on the positive side in the X-axis direction, of the main body 31. The connector 33 has a function of electrically coupling the inside and the outside of the container 2, and is electrically coupled to the substrate 6 via wiring. Here, the connector 33 overlaps with the flange 38 in plan view from the Z-axis direction. In this manner, by disposing the connector 33 at a position overlapping the flange 38, a size of the container 2 can be reduced.

The flange 38 protrudes from an upper end of the main body 31 toward a positive side in the X-axis direction. On the other hand, the flange 39 protrudes from the upper end of the main body 31 toward a negative side in the X-axis direction, that is, a side opposite to the flange 38. That is, the base 3 does not have a flange protruding from the main body 31 in the Y-axis direction. In this manner, by projecting the flanges 38 and 39 from the main body 31 having the X-axis direction as a longitudinal direction toward both sides in the X-axis direction, a length of the container 2 in the Y-axis direction can be effectively suppressed. Therefore, it is possible to miniaturize the container 2.

Further, as illustrated in FIGS. 1A and 1B, lower surfaces of the flanges 38 and 39 and a side surfaces of the main body 31 are coupled to a coupling portion between the flanges 38 and 39 and the main body 31 by a recess curved surface. Therefore, the portion has a tapered shape in which thicknesses of the flanges 38 and 39 gradually decrease toward the tip sides of the flanges 38 and 39. With such a configuration, a mechanical strength of the coupling portion between the flanges 38 and 39 and the main body 31 can be increased, and stress concentration on the portion can be reduced. Therefore, the container 2 has an excellent mechanical strength and is hard to break.

Further, as illustrated in FIG. 4, through holes 381 and 391 are formed in the flanges 38 and 39, and the container 2 is screwed to a target object via through holes 381 and 391.

The base 3 and the lid 4 are each made of aluminum. Accordingly, the container 2 is sufficiently hard. Meanwhile, constituent materials of the base 3 and the lid 4 are not particularly limited to aluminum, and for example, other metal materials such as zinc and stainless steel, various types of ceramics, various resin materials, and a composite material of a metal material and a resin material can also be used. Further, the base 3 and the lid 4 may be made of different constituent materials.

A configuration of the container 2 is not limited to the above configuration. For example, the flanges 38 and 39 may protrude on both sides in the Y-axis direction. Further, base end portions of the flanges 38 and 39 may not have a tapered shape but may have a flat shape having substantially the same thickness. In addition, the flanges 38 and 39 may be omitted. Further, the lid 4 may be omitted.

Next, the coupling member 8 will be described. As described above, the coupling member 8 couples the substrate 6 and the bottom surface of the recess portion 311. Accordingly, the substrate 6 is fixed to the container 2 and a posture of the inertial sensor module 5 is stabilized. Therefore, a detection characteristic of the inertial sensor module 5 is stabilized.

As illustrated in FIGS. 1A and 1B, in a state in which the substrate 6 is coupled to the bottom surface of the recess portion 311 via the coupling member 8, the substrate 6 floats from the bottom surface of the recess portion 311 and is not in contact with the container 2. The coupling member 8 has elasticity and is sufficiently soft. Specifically, an elastic modulus E1 of the coupling member 8 is smaller than an elastic modulus of the container 2, in particular, an elastic modulus E2 of the base 3 which is a part in which the coupling member 8 is in contact with the container 2. That is, $E1<E2$. Further, $E2/E1 \geq 10$ is preferable, and $E2/E1 \geq 100$ is more preferable. In this specification, "elastic modulus" means Young's modulus.

As described above, the substrate 6 and the container 2 are coupled with each other via the elastic coupling member 8 and the substrate 6 and the container 2 are kept in non-contact with each other, so that a vibration noise is less likely to be transmitted from the container 2 to the substrate 6. Specifically, as transmission paths of the vibration noise from the container 2 to the substrate 6, a first path which directly transmits from the container 2 to the substrate 6 and a second path which transmits from the container 2 to the substrate 6 via the coupling member 8 are provided. Of these, the substrate 6 and the container 2 are kept in non-contact with each other, so that transmission of the vibration noise through the first path can be effectively suppressed. On the other hand, transmission of the vibration noise through the second path can be effectively suppressed by using the coupling member 8 having elasticity and by absorbing and relaxing the vibration noise by the coupling member 8. Therefore, in the present embodiment, it is possible to suppress the transmission of the vibration noise from both the first and second paths, and to effectively suppress the transmission of the vibration noise from the container 2 to the substrate 6. Therefore, deterioration of the detection characteristic of the inertial sensor module 5 can be effectively suppressed.

The elastic modulus (Young's modulus) E1 is not particularly limited, but is preferably 1 GPa or less, more preferably 0.1 GPa or less, and still more preferably 0.01 GPa or less. Accordingly, the coupling member 8 can be provided with elasticity sufficient to absorb and relax the vibration noise. Therefore, the above effect can be more remarkably exhibited.

Further, the coupling member 8 is disposed in a natural state. The natural state means that compressive stress or tensile stress in the Z-axis direction due to a weight of the substrate 6 and the inertial sensor module 5 and a force other than pressure received from the gel material G is not substantially applied. When the coupling member 8 is deformed by applying the compressive stress or the tensile stress, the deformation may reduce the absorption and relaxation characteristics for the vibration noise of the coupling member 8. Therefore, by disposing the coupling member 8 in a natural state, it is possible to stably exhibit desired absorption and relaxation characteristics for the vibration noise.

A constituent material of the coupling member 8 is not particularly limited, and for example, various rubber materials such as natural rubber, isoprene rubber, butadiene rubber, styrene-butadiene rubber, nitrile rubber, chloroprene rubber, butyl rubber, acrylic rubber, ethylene-propylene rubber, hydrin-rubber, urethane rubber, silicone rubber, fluorine rubber or various thermoplastic elastomers such as styrene-based, polyolefin-based, polyvinyl chloride-based, polyurethane-based, polyester-based, polyamide-based, polybutadiene-based, trans-polyisoprene-based, fluorine rubber-based, chlorinated polyethylene-based are used, and one or two or more of these may be mixed and used. With such a material, the coupling member 8 having sufficient elasticity can be easily formed.

Further, as illustrated in FIG. 4, in the present embodiment, the substrate 6 and the bottom surface of the recess portion 311 are coupled by the three coupling members 8. When viewed from the Z-axis direction in plan view, each coupling member 8 is disposed outside the inertial sensor module 5, that is, so as not to overlap with the inertial sensor module 5. With such a disposition, even when a vibration noise cannot be completely absorbed by the coupling member 8 and a part of the vibration noise is transmitted to the substrate 6, it is possible to keep a transmission location of the vibration noise away from the inertial sensor module 5, and it becomes difficult for the vibration noise to be transmitted to the inertial sensor module 5. Therefore, the transmission of the vibration noise to the inertial sensor module 5 can be effectively suppressed.

Further, in plan view from the Z-axis direction, two of the three coupling members 8 are located on the positive side in the X-axis direction based on the inertial sensor module 5, and the remaining one coupling member 8 is provided to be located on the negative side in the X-axis direction based on the inertial sensor module 5. The two coupling members 8 located on the positive side in the X-axis direction are arranged side by side in the Y-axis direction. By arranging the three coupling members 8 in this manner, the substrate 6 can be supported by a surface by locating the inertial sensor module 5 at a center, so that the posture of the inertial sensor module 5 in the container 2 is more stabilized. Further, by setting the number of coupling members 8 to three, which is a minimum number capable of supporting the substrate 6 by the surface, the number of the second paths described above can be reduced, and it is possible to effectively suppress the transmission of the vibration noise from the container 2 to the substrate 6. Meanwhile, the number of coupling members 8 is not particularly limited, and may be one, two, or four or more. Further, the arrangement of the coupling member 8 is not particularly limited thereto.

As illustrated in FIG. 5, the coupling member 8 has a base portion 81 located between the substrate 6 and the bottom surface of the recess portion 311, a first engaging portion 82 for engaging with the substrate 6, and a second engaging portion 83 for engaging with the container 2. The base portion 81 functions as a spacer for forming a gap Q1 between the substrate 6 and the bottom surface of the recess portion 311 and the substrate 6 and the container 2 are kept in non-contact with each other. With such a configuration, the coupling member 8 has a simple configuration.

The first engaging portion 82 is configured to include a first protrusion 821 protruding from the base portion 81 toward the substrate 6 side, that is, on the positive side in the Z-axis direction. A first hole 60 penetrating through the substrate 6 in the thickness direction is formed at the substrate 6, and the first protrusion 821 is inserted into the first hole 60. With such a configuration, the coupling member 8 and the substrate 6 can be engaged with each other by a simple method. The first hole 60 may be a bottomed recess portion which opens toward the lower surface of the substrate 6 instead of a through hole. On the other hand, the second engaging portion 83 is configured to include a second protrusion 831 protruding from the base portion 81 to the bottom surface side of the recess portion 311, that is, on the negative side in the Z-axis direction. A second hole 30 which opens toward the bottom surface of the recess portion 311 is formed at the container 2, and the second protrusion 831 is inserted into the second hole 30. With such a configuration, the coupling member 8 and the container 2 can be engaged with each other by a simple method.

In the present embodiment, the base portion 81, the first protrusion 821, and the second protrusion 831 each have a circular shape in plan view from the Z-axis direction and are arranged concentrically with each other. Meanwhile, a shape of the coupling member 8 is not particularly limited. For example, in a modification example illustrated in FIG. 6, the base portion 81, the first protrusion 821, and the second protrusion 831 each have a rectangular shape in plan view. In another modification example illustrated in FIG. 7, the base portion 81 has a rectangular shape in plan view, and the first protrusions 821 and the second protrusions 831 have circular shapes in plan view. In still another modification example illustrated in FIG. 8, the base portion 81 has a circular shape in plan view, and the first protrusions 821 and the second protrusions 831 have rectangular shapes in plan view. In still another modification example illustrated in FIG. 9, the first protrusion 821 and the second protrusion 831 are arranged eccentrically based on the base portion 81. Further, in plan view, the first protrusion 821 and the second protrusion 831 are arranged so as to face each other via a center of the base portion 81 so that axes of the first protrusion 821 and the second protrusion 831 do not overlap with each other.

Figure 6:
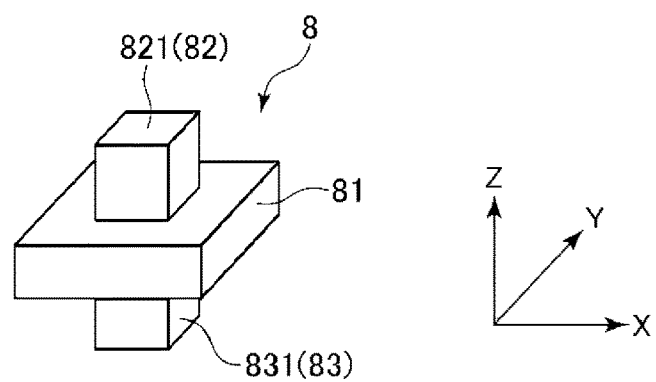
FIG. 6 is a perspective view illustrating a modification example of the coupling member.
Figure 7:
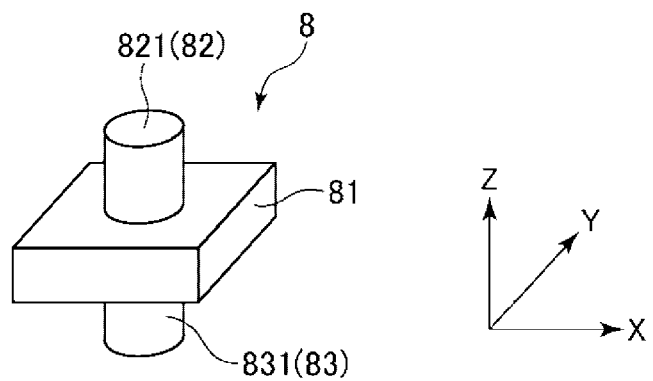
FIG. 7 is a perspective view illustrating another modification example of the coupling member.
Figure 8:
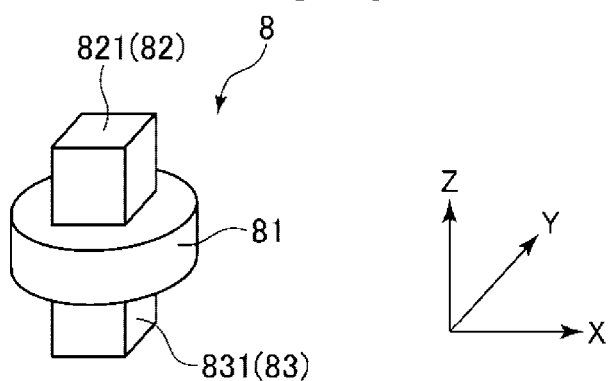
FIG. 8 is a perspective view illustrating still another modification example of the coupling member.
Figure 9:
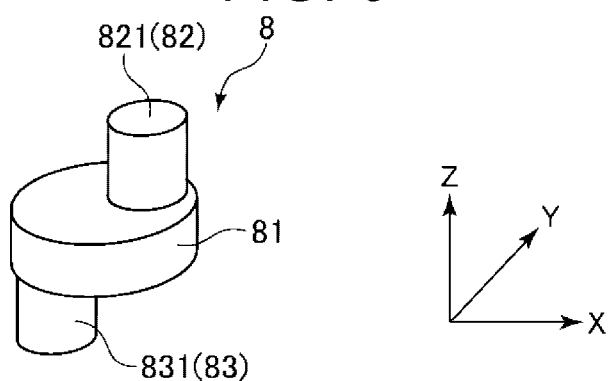
FIG. 9 is a perspective view illustrating still another modification example of the coupling member.

Here, in the present embodiment, as illustrated in FIG. 10, a diameter R2 of the first protrusion 821 is larger than a diameter R1 of the first hole 60. That is, R1<R2, and the first protrusion 821 is inserted into the first hole 60 in a compressed state. Therefore, the first protrusion 821 is press-fitted into the first hole 60. Accordingly, a frictional resistance between the coupling member 8 and the substrate 6 increases, and the coupling member 8 and the substrate 6 can be more firmly fixed to each other. In the same manner, a diameter R4 of the second protrusion 831 is larger than a diameter R3 of the second hole 30. That is, R3<R4, and the second protrusion 831 is inserted into the second hole 30 in a compressed state. Therefore, the second protrusion 831 is press-fitted into the second hole 30. Accordingly, a frictional resistance between the coupling member 8 and the base 3 increases, and the coupling member 8 and the base 3 can be more firmly fixed to each other. As illustrated in FIGS. 6 and 8, when the first protrusion 821 and the second protrusion 831 do not have circular shapes in plan view, the diameters R2 and R4 described above can be respectively read as the maximum widths.

Next, the gel material G will be described. As illustrated in FIG. 1A, the storage space S is filled with the gel material G. That is, the gel material G is disposed in the entire storage space S. Therefore, the substrate 6 and the inertial sensor module 5 are covered with the gel material G. Accordingly, the substrate 6 and the inertial sensor module 5 can be protected from moisture and water. Further, by filling the storage space S with the gel material G, the substrate 6 can be supported by a gel material G together with the coupling member 8 from the container 2. Therefore, the posture of the inertial sensor module 5 is more stabilized. In addition, regarding the gap Q1 between the substrate 6 and the bottom surface of the recess portion 311 and a gap Q2 between the substrate 6 and the lid 4, since the gel material G is also filled in particularly a portion overlapping with the inertial sensor module 5 in plan view from the Z-axis direction, that is, a portion surrounded by a triangle coupling the three coupling members 8, as compared with a case without the gel material G, it is possible to suppress bending of the substrate 6 in the thickness direction when acceleration in the Z-axis direction is applied. Therefore, it is possible to suppress occurrence of a vibration noise due to the bending of the substrate 6, and it is possible to effectively suppress deterioration of the detection characteristic of the inertial sensor module 5.

Although it can be said that the gel material G is disposed in the entire storage space S, the gel material G may be disposed in the storage space S to the extent that the inertial sensor module 5 is not displaced. That is, as illustrated in FIG. 1B, when there is a space in which the gel material G is not disposed in a part of the storage space S, it is sufficient that a hardness of the gel material G or an adhesive force between the gel material G and the inner wall surface of the container 2 is equal to or more than a force necessary for supporting a weight of the inertial sensor module 5, for example, regarding an inner wall area of the container 2 facing the storage space S, an area in which the gel material G adheres to the container 2 may be larger than an area in which the gel material G does not adhere to the container 2, and the inertial sensor module 5 may be covered with the gel material G.

A penetration degree of the gel material G is not particularly limited, but is preferably equal to or more than 30 and equal to or less than 100, more preferably equal to or more than 40 and equal to or less than 90, and further preferably equal to or more than 50 and equal to or less than 70. Accordingly, the gel material G having an appropriate hardness is obtained, and the substrate 6 can be supported from the container 2 in a more stable posture. It is also possible to effectively suppress the transmission of the vibration noise from the container 2 to the substrate 6 via the gel material G. Further, the bending of the substrate 6 in the thickness direction described above can be effectively suppressed. The penetration degree can be measured by a test method according to JIS K2207. The constituent material of such a gel material G is not particularly limited, but, for example, silicone gel, various kinds of grease or the like can be used.

The gaps Q1 and Q2 may be filled with something other than the gel material G, for example, a liquid, and further, the gaps Q1 and Q2 may not be filled with anything.

Hereinbefore, the sensor unit 1 is described. As described above, such a sensor unit 1 includes the substrate 6, the inertial sensor module 5 mounted at the substrate 6, the container 2 having the storage space S for storing the substrate 6 and the inertial sensor module 5, and the coupling member 8 which couples the container 2 and the substrate 6 in a state in which the container 2 and the substrate 6 are in non-contact with each other. Further, the coupling member 8 has elasticity, and the elastic modulus E1 of the coupling member 8 is smaller than the elastic modulus E2 of the base 3 which mainly constitutes the container 2. As described above, the substrate 6 and the container 2 are coupled with each other by using the elastic coupling member 8 and the substrate 6 and the container 2 are kept in non-contact with each other, so that a vibration noise is less likely to be transmitted from the container 2 to the substrate 6. Therefore, deterioration of the detection characteristic of the inertial sensor module 5 can be effectively suppressed.

Further, as described above, the coupling member 8 is disposed in a natural state. When the coupling member 8 is deformed by applying the compressive stress or the tensile stress, the deformation may reduce the absorption and relaxation characteristics for the vibration noise. Therefore, by disposing the coupling member 8 in a natural state, it is possible to stably exhibit desired absorption and relaxation characteristics for the vibration noise.

Further, as described above, the coupling member 8 is located outside the inertial sensor module 5 in plan view of the substrate 6, that is, in plan view in the Z-axis direction. Accordingly, even when a vibration noise cannot be completely absorbed by the coupling member 8 and a part of the vibration noise is transmitted to the substrate 6, it is possible to keep a transmission portion of the vibration noise away from the inertial sensor module 5, and it becomes difficult for the vibration noise to be transmitted to the inertial sensor module 5. Therefore, the sensor unit 1 can effectively suppress the transmission of the vibration noise from the container 2 to the substrate 6.

Further, as described above, the coupling member 8 is located between the substrate 6 and the container 2, and includes the base portion 81 which forms the gap Q1 between the substrate 6 and the container 2, the first engaging portion 82 which engages with the substrate 6, and the second engaging portion 83 which engages with the container 2. Accordingly, the coupling member 8 has a simple configuration.

Further, as described above, the gel material G is provided to be disposed in the gap Q1. Accordingly, it is possible to suppress bending of the substrate 6 in the thickness direction when acceleration in the Z-axis direction is applied. Therefore, it is possible to effectively suppress occurrence of a vibration noise due to the bending of the substrate 6, and it is possible to effectively suppress deterioration of the detection characteristic of the inertial sensor module 5.

Further, as described above, the first engaging portion 82 has the first protrusion 821 protruding from the base portion 81 toward the substrate 6 side and inserted into the first hole 60 provided in the substrate 6. In addition, the second engaging portion 83 has the second protrusion 831 which protrudes from the base portion 81 toward the container 2 side and is inserted into the second hole 30 provided in the container 2. With such a configuration, the coupling member 8 and the substrate 6 can be engaged with each other by a simple method, and the coupling member 8 and the container 2 can be engaged with each other by a simple method.

As described above, the sensor unit 1 has the three coupling members 8. Accordingly, the substrate 6 can be supported in a stable posture.

Second Embodiment

Figure 11:
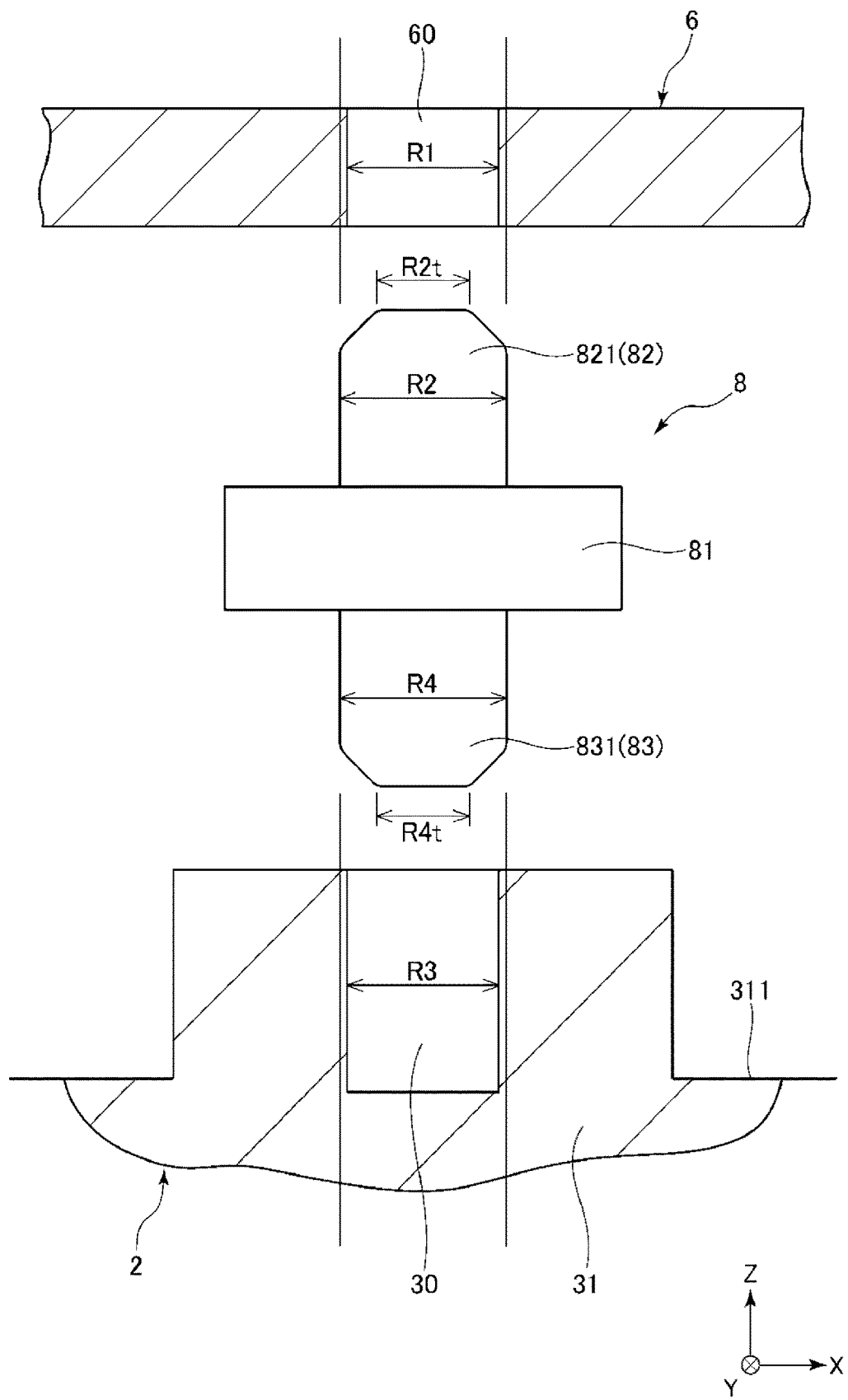
FIG. 11 is an exploded cross-sectional view illustrating a coupling member included in a sensor unit according to a second embodiment.

FIG. 11 is an exploded cross-sectional view illustrating a coupling member included in a sensor unit according to a second embodiment.

The sensor unit 1 according to the present embodiment has the same manner as the sensor unit 1 of the above-described first embodiment except that the coupling member 8 has a different configuration. In the following description, the sensor unit 1 according to the second embodiment will be described focusing on differences from the first embodiment described above, and the description of the same matters will be omitted. Further, in FIG. 11, the same components as those in the above-described embodiment are denoted by the same reference numerals. Since the three coupling members 8 have the identical configuration, the one coupling member 8 will be described below as a representative.

As illustrated in FIG. 11, in the coupling member 8 according to the present embodiment, a tip portion of the first protrusion 821 is tapered. That is, at the tip portion of the first protrusion 821, the diameter R2 gradually decreases toward the tip side. A diameter R2$t$ of the tip is smaller than the diameter R1 of the first hole 60. Accordingly, this facilitates insertion of the first protrusion 821 into the first hole 60. In the same manner, a tip portion of the second protrusion 831 is tapered. That is, at the tip portion of the second protrusion 831, the diameter R4 gradually decreases toward the tip side. A diameter R4$t$ of the tip is smaller than the diameter R3 of the second hole 30. Accordingly, it becomes easy to insert the second protrusion 831 into the second hole 30.

According to the second embodiment as described above, the same effect as that of the first embodiment can be obtained.

Third Embodiment

Figure 12:
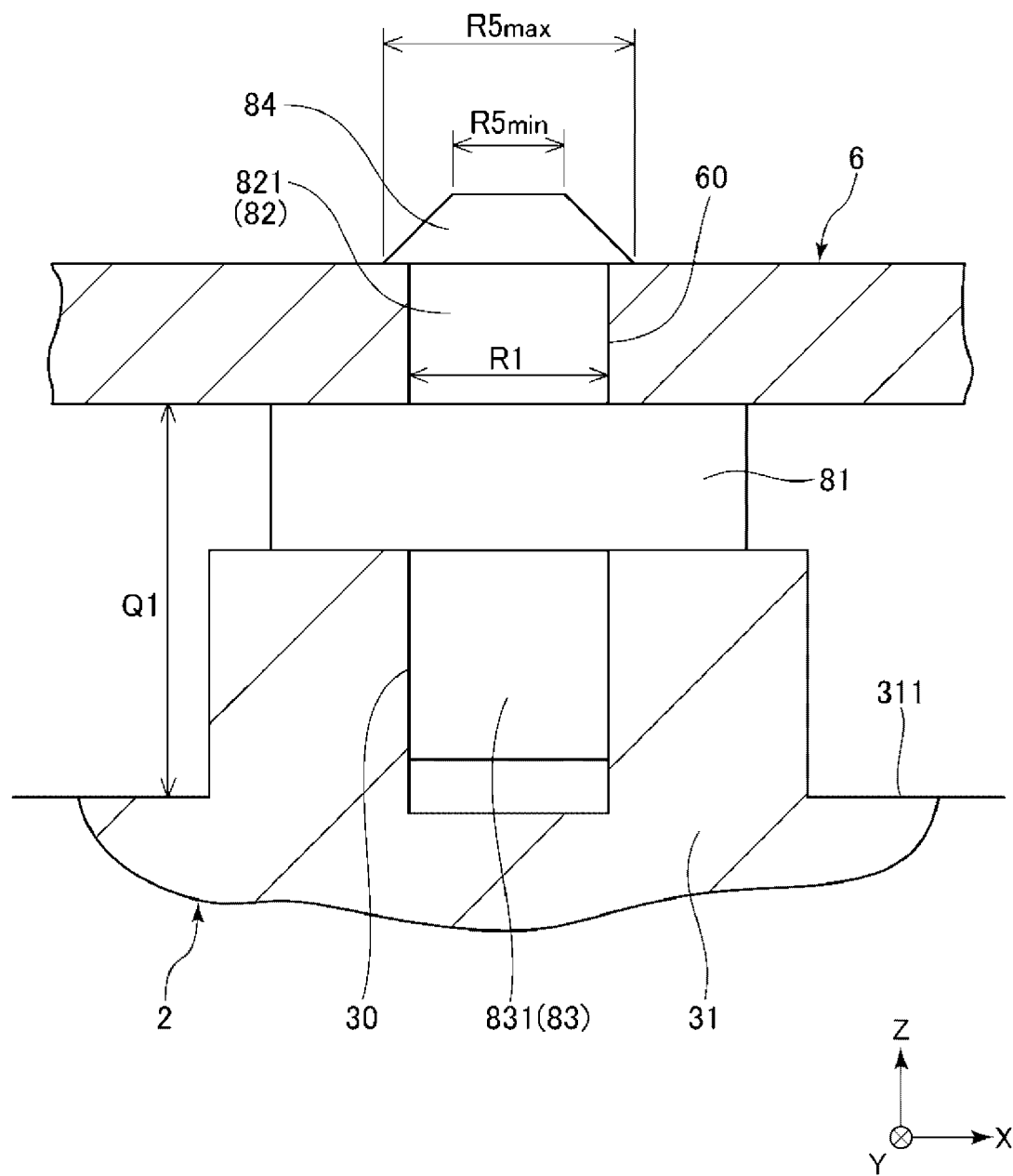
FIG. 12 is a cross-sectional view illustrating a coupling member included in a sensor unit according to a third embodiment.

FIG. 12 is a cross-sectional view illustrating a coupling member included in a sensor unit according to a third embodiment.

The sensor unit 1 according to the present embodiment has the same manner as the sensor unit 1 of the above-described first embodiment except that the coupling member 8 has a different configuration. In the following description, the sensor unit 1 according to the third embodiment will be described focusing on differences from the first embodiment described above, and the description of the same matters will be omitted. Further, in FIG. 12, the same components as those in the above-described embodiment are denoted by the same reference numerals. Since the three coupling members 8 have the identical configuration, the one coupling member 8 will be described below as a representative.

As illustrated in FIG. 12, the coupling member 8 according to the present embodiment includes a regulation portion 84 which regulates detachment of the substrate 6 from the first protrusion 821. By providing the regulation portion 84, it is possible to suppress unintended detachment of the substrate 6 from the coupling member 8. Therefore, the posture of the inertial sensor module 5 with respect to the container 2 is more stabilized. The regulation portion 84 is provided at the tip portion of the first protrusion 821 so that the substrate 6 is interposed between the regulation portion 84 and the base portion 81. Further, the regulation portion 84 has a tapered shape in which a diameter gradually decreases toward the tip side, and a maximum diameter R5max located at a lower end portion is larger than the diameter R1 of the first hole 60. That is, R5max>R1. Accordingly, the substrate 6 is caught by the regulation portion 84, and it is possible to effectively suppress detachment of the substrate 6 from the first protrusion 821. On the other hand, a minimum diameter R5min located at the upper end of the regulation portion 84 is smaller than the diameter R1. That is, R5min<R1. Accordingly, it becomes easy to insert the first protrusion 821 into the first hole 60.

As described above, the coupling member 8 according to the present embodiment includes a regulation portion 84 which regulates detachment of the substrate 6 from the first protrusion 821. Accordingly, it is possible to effectively suppress unintended detachment of the substrate 6 from the coupling member 8. Therefore, the posture of the inertial sensor module 5 with respect to the container 2 is more stabilized.

According to the third embodiment as described above, the same effect as that of the first embodiment can be obtained. Meanwhile, the configuration of the regulation portion 84 is not particularly limited as long as the above-described function can be exhibited. Further, the coupling member 8 may have a regulation portion which regulates detachment of the second protrusion 831 from the second hole 30. In this case, the same configuration as that of the regulation portion 84 can be used.

Fourth Embodiment

Figure 13:
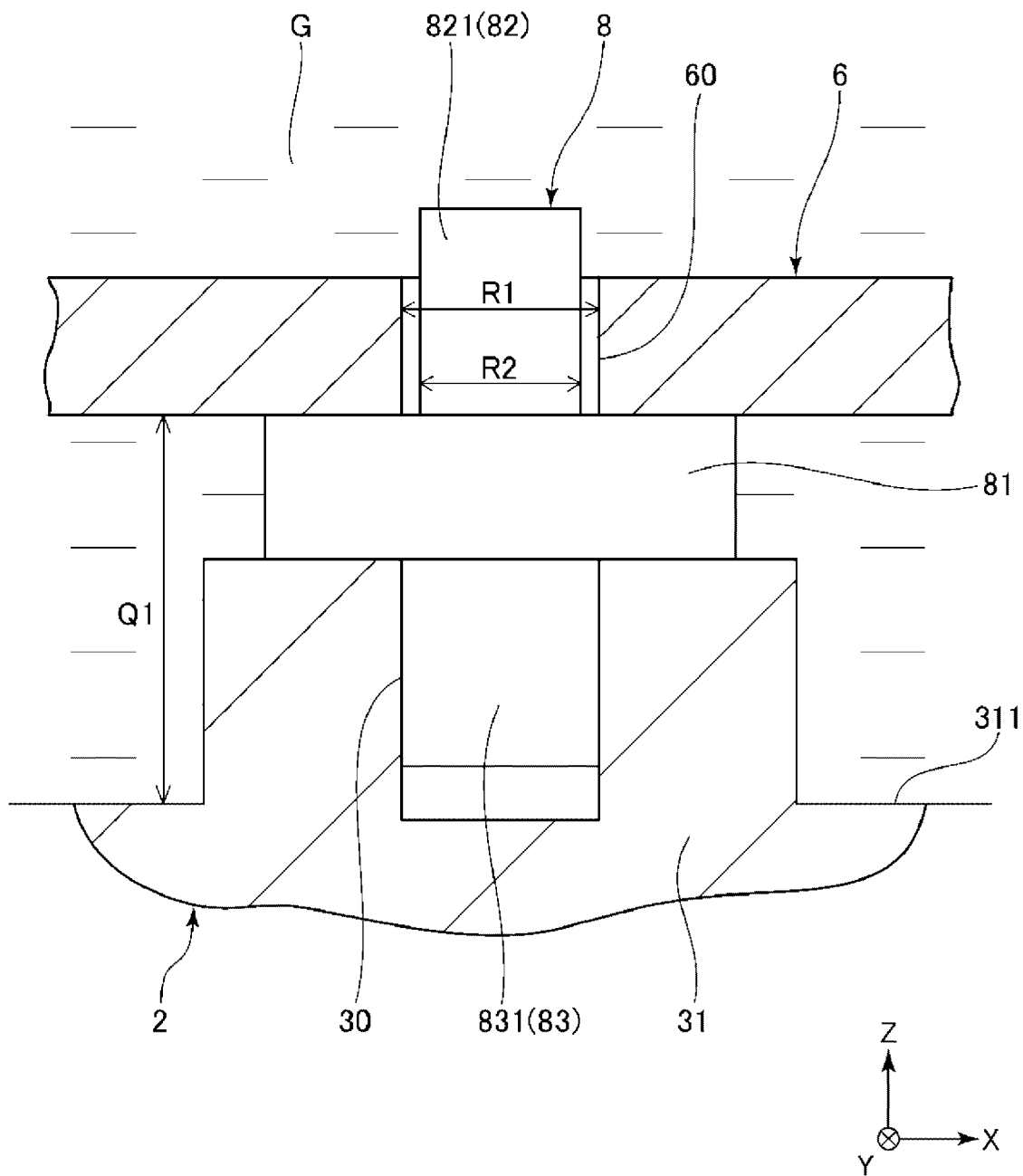
FIG. 13 is a cross-sectional view illustrating a coupling member included in a sensor unit according to a fourth embodiment.

FIG. 13 is a cross-sectional view illustrating a coupling member included in a sensor unit according to a fourth embodiment.

The sensor unit 1 according to the present embodiment has the same manner as the sensor unit 1 of the above-described first embodiment except that the coupling member 8 has a different configuration. In the following description, the sensor unit 1 according to the fourth embodiment will be described focusing on differences from the first embodiment described above, and the description of the same matters will be omitted. Further, in FIG. 13, the same components as those in the above-described embodiment are denoted by the same reference numerals. Since the three coupling members 8 have the identical configuration, the one coupling member 8 will be described below as a representative.

As illustrated in FIG. 13, in the coupling member 8 according to the present embodiment, the diameter R2 of the first protrusion 821 is smaller than the diameter R1 of the first hole 60. That is, R1>R2, and the first protrusion 821 is loosely fitted into the first hole 60. In other words, the first protrusion 821 is inserted into the first hole 60 with a wide margin. Accordingly, the substrate 6 can be displaced in the Z-axis direction based on the first protrusion 821 while being regulated by the gel material G. Therefore, for example, when an excessive impact is applied in the Z-axis direction, the substrate 6 is displaced in the Z-axis direction based on the first protrusion 821, so that it is possible to soften the impact applied to the substrate 6 or the inertial sensor module 5. The second protrusion 831 is press-fitted into the second hole 30 in the same manner as in the first embodiment described above. Accordingly, it is possible to effectively suppress the substrate 6 together with the coupling member 8 from being detached from the container 2 due to the impact.

As described above, in the sensor unit 1 according to the present embodiment, the first protrusion 821 is loosely fitted into the first hole 60, and the second protrusion 831 is press-fitted into the second hole 30. Therefore, when an excessive impact is applied in the Z-axis direction, the substrate 6 is displaced in the Z-axis direction based on the first protrusion 821, so that it is possible to soften the impact applied to the substrate 6. Further, it is possible to effectively suppress detachment of the coupling member 8 from the second hole 30 due to the impact.

According to the fourth embodiment as described above, the same effect as that of the first embodiment can be obtained. The regulation portion 84 according to the third embodiment described above may be combined with the coupling member 8 according to the present embodiment. In this case, a distance between the regulation portion 84 and the base portion 81 is preferably set to be larger than a thickness of the substrate 6, so the substrate 6 can be preferably displaced in the Z-axis direction between the regulation portion 84 and the base portion 81.

Fifth Embodiment

Figure 14:
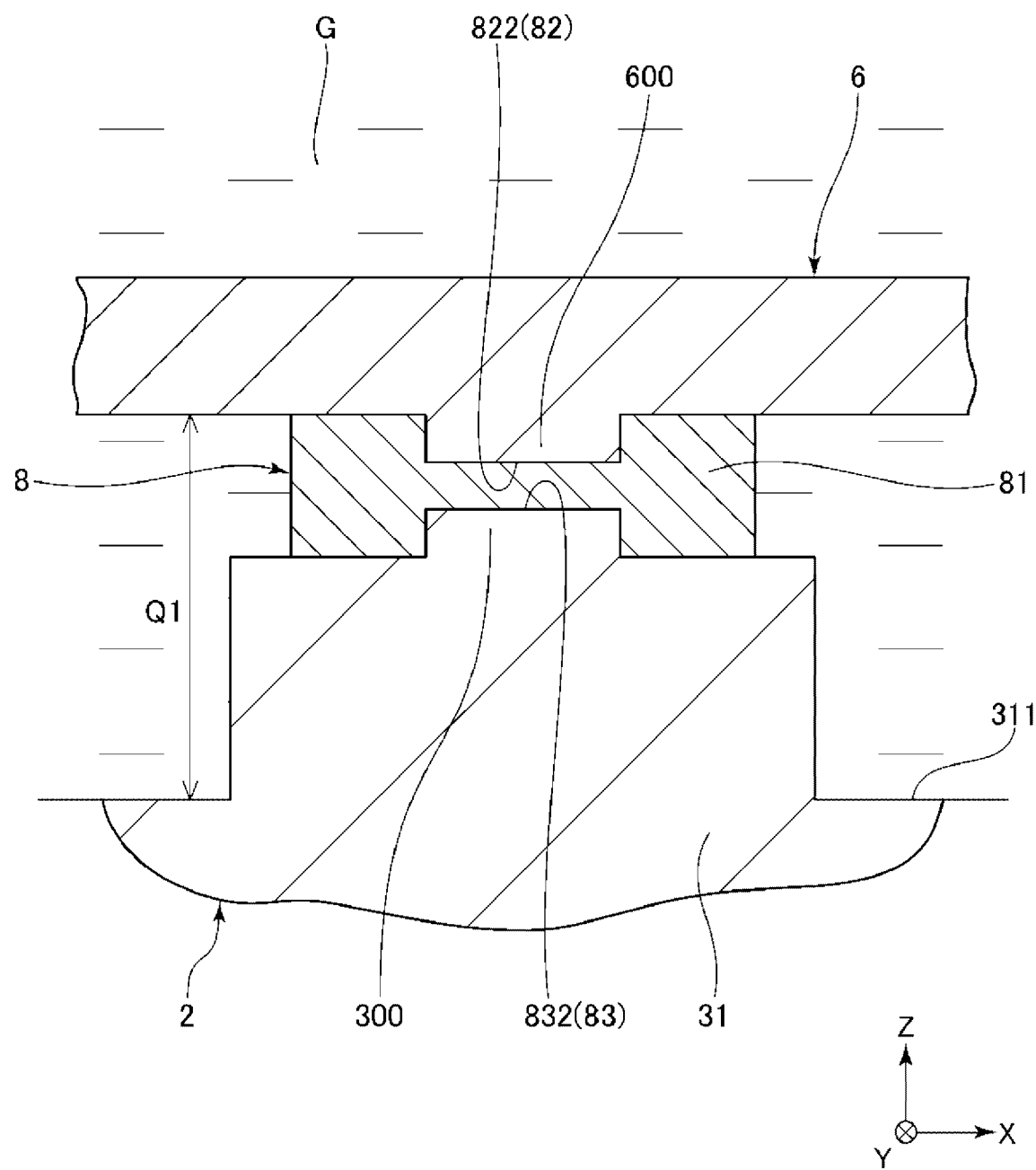
FIG. 14 is a cross-sectional view illustrating a coupling member included in a sensor unit according to a fifth embodiment.

FIG. 14 is a cross-sectional view illustrating a coupling member included in a sensor unit according to a fifth embodiment.

The sensor unit 1 according to the present embodiment has the same manner as the sensor unit 1 of the above-described first embodiment except that the coupling member 8 has a different configuration. In the following description, the sensor unit 1 according to the fifth embodiment will be described focusing on differences from the first embodiment described above, and the description of the same matters will be omitted. Further, in FIG. 14, the same components as those in the above-described embodiment are denoted by the same reference numerals. Since the three coupling members 8 have the identical configuration, the one coupling member 8 will be described below as a representative.

As illustrated in FIG. 14, in the coupling member 8 according to the present embodiment, the first engaging portion 82 is configured to include a recess portion 822 which opens on the upper surface of the base portion 81. A protrusion 600 protruding downward is formed at the substrate 6, and the protrusion 600 is inserted into the recess portion 822. With such a configuration, the coupling member 8 and the substrate 6 can be engaged with each other by a simple method. On the other hand, the second engaging portion 83 is configured to include a recess portion 832 which opens toward the lower surface of the base portion 81. A protrusion 300 protruding upward from the bottom surface of the recess portion 311 is formed at the base 3, and the protrusion 300 is inserted into the recess portion 832. With such a configuration, the coupling member 8 and the container 2 can be engaged with each other by a simple method.

According to the fifth embodiment as described above, the same effect as that of the first embodiment can be obtained.

Sixth Embodiment

Figure 15:
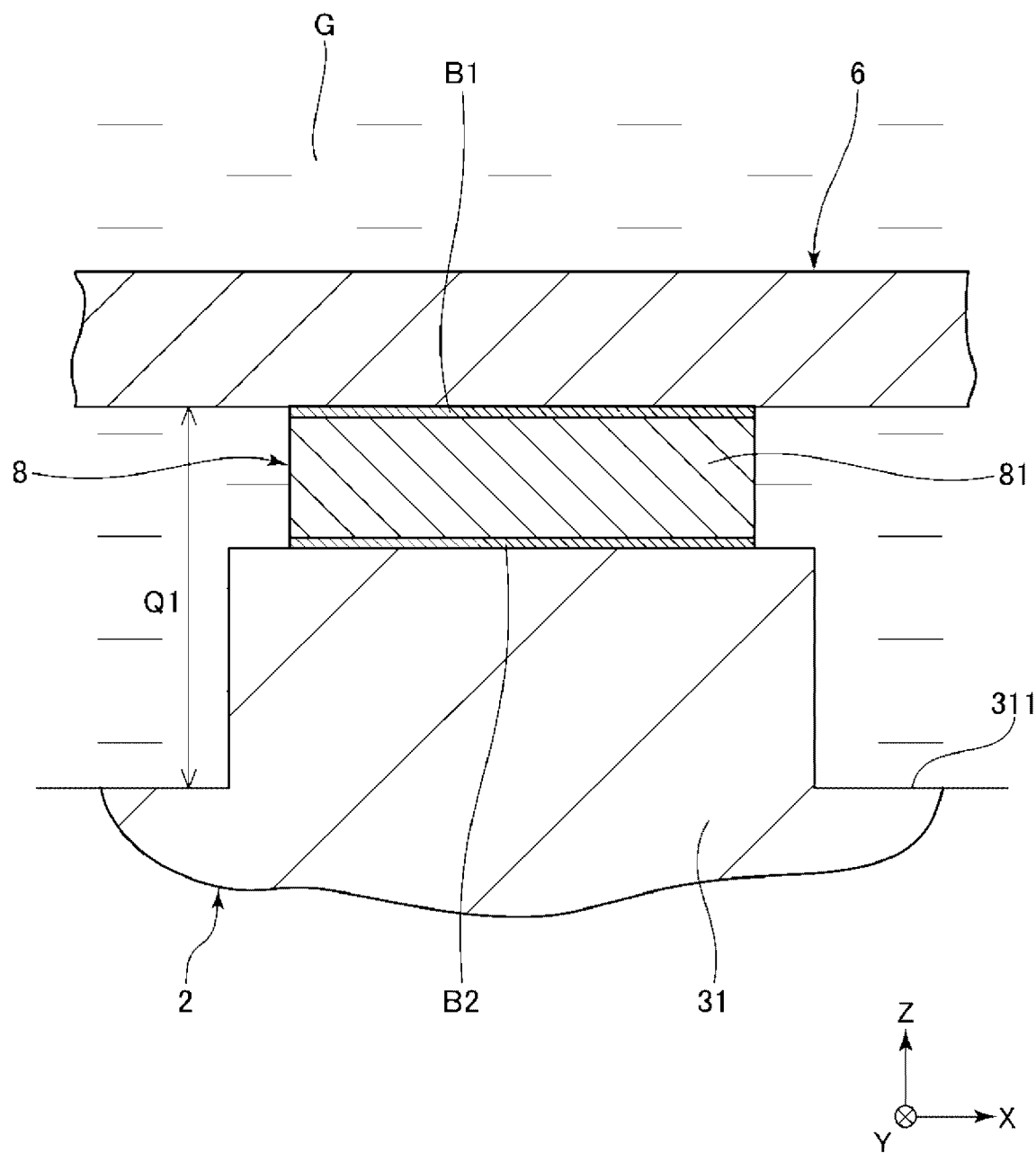
FIG. 15 is a cross-sectional view illustrating a coupling member included in a sensor unit according to a sixth embodiment.

FIG. 15 is a cross-sectional view illustrating a coupling member included in a sensor unit according to a sixth embodiment.

The sensor unit 1 according to the present embodiment has the same manner as the sensor unit 1 of the above-described first embodiment except that the coupling member 8 has a different configuration. In the following description, the sensor unit 1 according to the fifth embodiment will be described focusing on differences from the first embodiment described above, and the description of the same matters will be omitted. Further, in FIG. 15, the same components as those in the above-described embodiment are denoted by the same reference numerals. Since the three coupling members 8 have the identical configuration, the one coupling member 8 will be described below as a representative.

As illustrated in FIG. 15, in the coupling member 8 according to the present embodiment, the first engaging portion 82 and the second engaging portion 83 are omitted from the configuration of the first embodiment described above. That is, the coupling member 8 is configured to include the base portion 81. The coupling member 8 is joined to the substrate 6 via a joining member B1 and is joined to a bottom surface of the recess portion 311 via a joining member B2. The joining members B1 and B2 are not particularly limited, and various adhesives can be used, for example.

According to the sixth embodiment as described above, the same effect as that of the first embodiment can be obtained.

Seventh Embodiment

Figure 16:
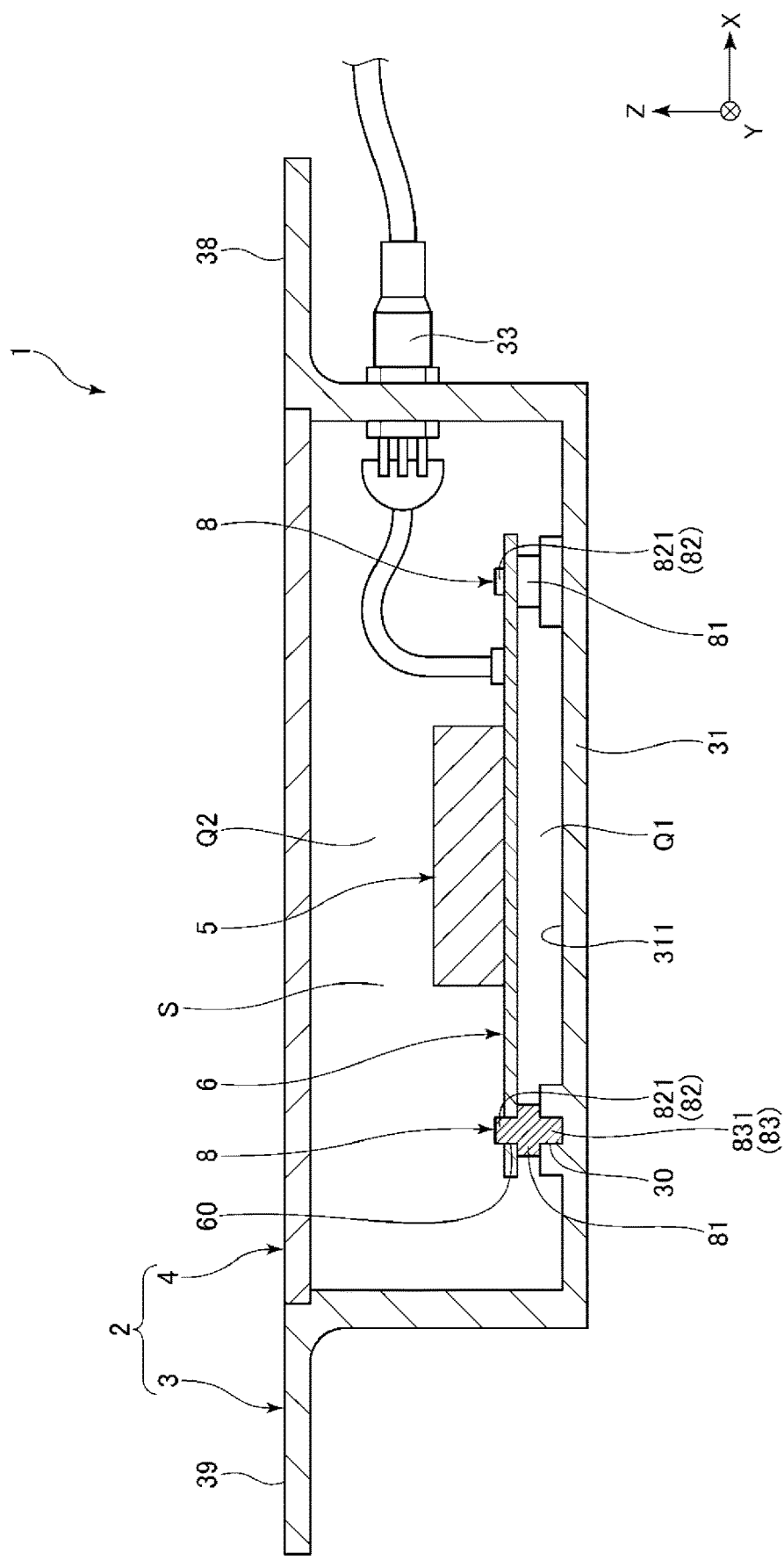
FIG. 16 is a cross-sectional view illustrating a sensor unit according to a seventh embodiment.

FIG. 16 is a cross-sectional view illustrating a sensor unit according to a seventh embodiment.

The sensor unit 1 according to the present embodiment has the same manner as the sensor unit 1 according to the first embodiment described above except that the gel material G is omitted. In the following description, the sensor unit 1 according to the seventh embodiment will be described focusing on differences from the first embodiment described above, and the description of the same matters will be omitted. Further, in FIG. 16, the same components as those in the above-described embodiment are denoted by the same reference numerals.

As illustrated in FIG. 16, the sensor unit 1 according to the present embodiment has a configuration in which the gel material G is omitted from the configuration of the first embodiment described above. Accordingly, for example, the number of components is reduced and the cost of the sensor unit 1 is reduced as compared with the configuration of the first embodiment described above.

According to the seventh embodiment as described above, the same effect as that of the first embodiment can be obtained.

Eighth Embodiment

Figure 17:
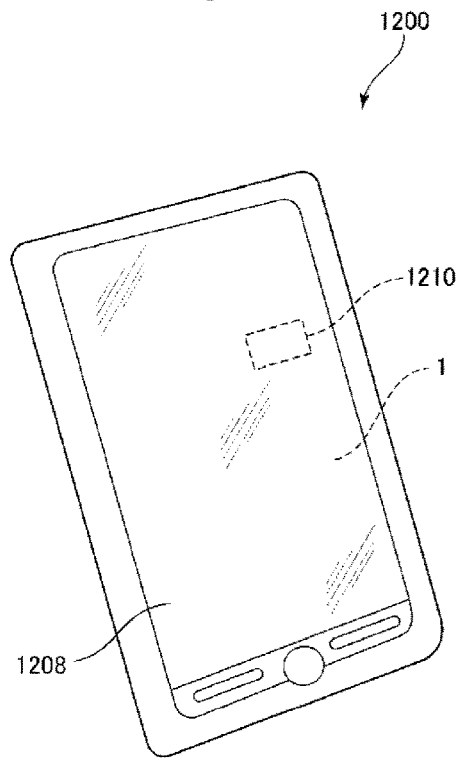
FIG. 17 is a perspective view illustrating a smartphone according to an eighth embodiment.

FIG. 17 is a perspective view illustrating a smartphone according to an eighth embodiment.

A smartphone 1200 as an electronic apparatus illustrated in FIG. 17 includes the sensor unit 1 and a control circuit 1210 which performs a control based on a detection signal output from the sensor unit 1. Detection data detected by the sensor unit 1 is transmitted to the control circuit 1210, and the control circuit 1210 recognizes a posture and behavior of the smartphone 1200 from the received detection data, so that an image displayed on a display portion 1208 can be changed, a warning sound or a sound effect can be emitted, and a vibration motor can be driven to vibrate a main body.

The smartphone 1200 as such an electronic apparatus includes the sensor unit 1 and the control circuit 1210 which performs a control based on a detection signal output from the sensor unit 1. Therefore, the effect of the sensor unit 1 described above can be obtained, and high reliability can be exhibited.

In addition to the smartphone 1200 described above, the electronic apparatus can be applied to, for example, a wearable terminal such as a personal computer, a digital still camera, a tablet terminal, a watch, a smart watch, an ink jet printer, a laptop personal computer, a TV, and a head mounted display (HMD), a video camera, a video tape recorder, a car navigation system, a pager, an electronic organizer, an electronic dictionary, a calculator, an electronic game apparatus, a word processor, a workstation, a videophone, a security TV monitor, electronic binoculars, a POS terminal, a medical apparatus, a fish detector, various measurement apparatuses, a moving object terminal base station apparatus, various instruments such as a vehicle, an aircraft, and a ship, a flight simulator, a network server, and the like.

Ninth Embodiment

Figure 18:
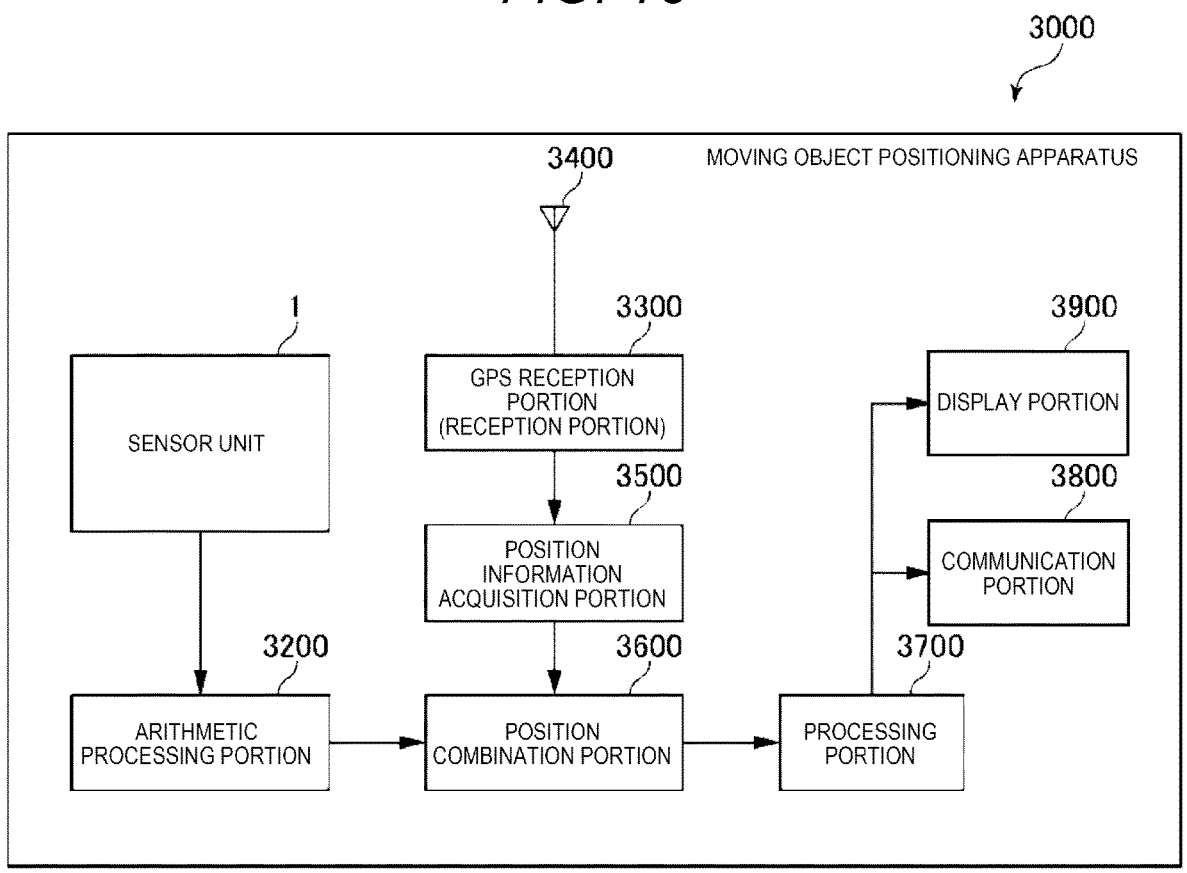
FIG. 18 is a block diagram illustrating an entire system of a moving object positioning apparatus according to a ninth embodiment.
Figure 19:
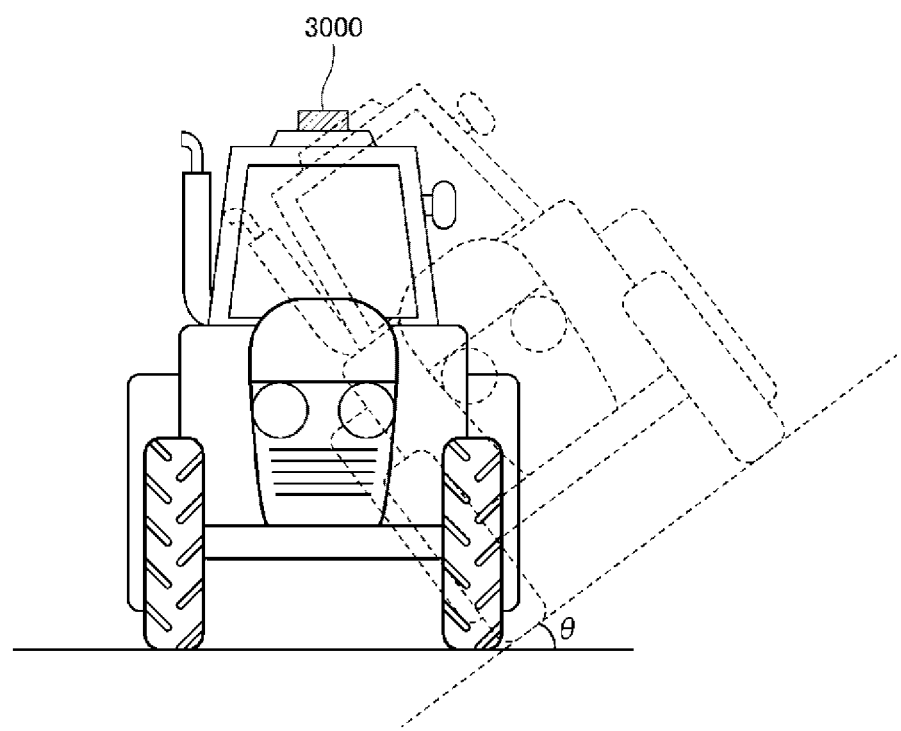
FIG. 19 is a diagram illustrating an operation of the moving object positioning apparatus illustrated in FIG. 18.

FIG. 18 is a block diagram illustrating an entire system of a moving object positioning apparatus according to a ninth embodiment. FIG. 19 is a diagram illustrating an operation of the moving object positioning apparatus illustrated in FIG. 18.

A moving object positioning apparatus 3000 illustrated in FIG. 18 is an apparatus which is used by being mounted at a moving object to perform positioning of the moving object. The moving object is not particularly limited, and may be a bicycle, an automobile, a motorcycle, a train, an airplane, a ship, or the like, but in the present embodiment, a use of a four-wheeled automobile as the moving object will be described.

The moving object positioning apparatus 3000 includes the sensor unit 1, an arithmetic processing portion 3200, a GPS reception portion 3300, a reception antenna 3400, a position information acquisition portion 3500, a position combination portion 3600, a processing portion 3700, a communication portion 3800, and a display portion 3900.

The arithmetic processing portion 3200 receives acceleration data and angular velocity data from the sensor unit 1, performs an inertial navigation arithmetic process on these pieces of data, and outputs inertial navigation positioning data including acceleration and a posture of the moving object. The GPS reception portion 3300 receives a signal from a GPS satellite via the reception antenna 3400. Further, the position information acquisition portion 3500 outputs GPS positioning data indicating a position (a latitude, a longitude, and an altitude), a speed, and an azimuth of the moving object positioning apparatus 3000 based on the signal received by the GPS reception portion 3300. The GPS positioning data also includes status data indicating a reception state, a reception time, and the like.

The position combination portion 3600 calculates a position of the moving object, specifically, which position on a ground the moving object is traveling, based on the inertial navigation positioning data output from the arithmetic processing portion 3200 and the GPS positioning data output from the position information acquisition portion 3500. For example, even when positions of moving objects included in the GPS positioning data are the same, as illustrated in FIG. 19, when postures of the moving objects are different from each other due to the influence of an inclination e of the ground or the like, it means that the moving objects are traveling at different positions on the ground. Therefore, it is not possible to calculate an accurate position of the moving object only with the GPS positioning data. Therefore, the position combination portion 3600 uses the inertial navigation positioning data to calculate which position on the ground the moving object is traveling.

The processing portion 3700 performs a predetermined process on the position data output from the position combination portion 3600 and displays the position data on the display portion 3900 as a positioning result. Further, the position data may be transmitted to an external apparatus by the communication portion 3800.

Tenth Embodiment

Figure 20:
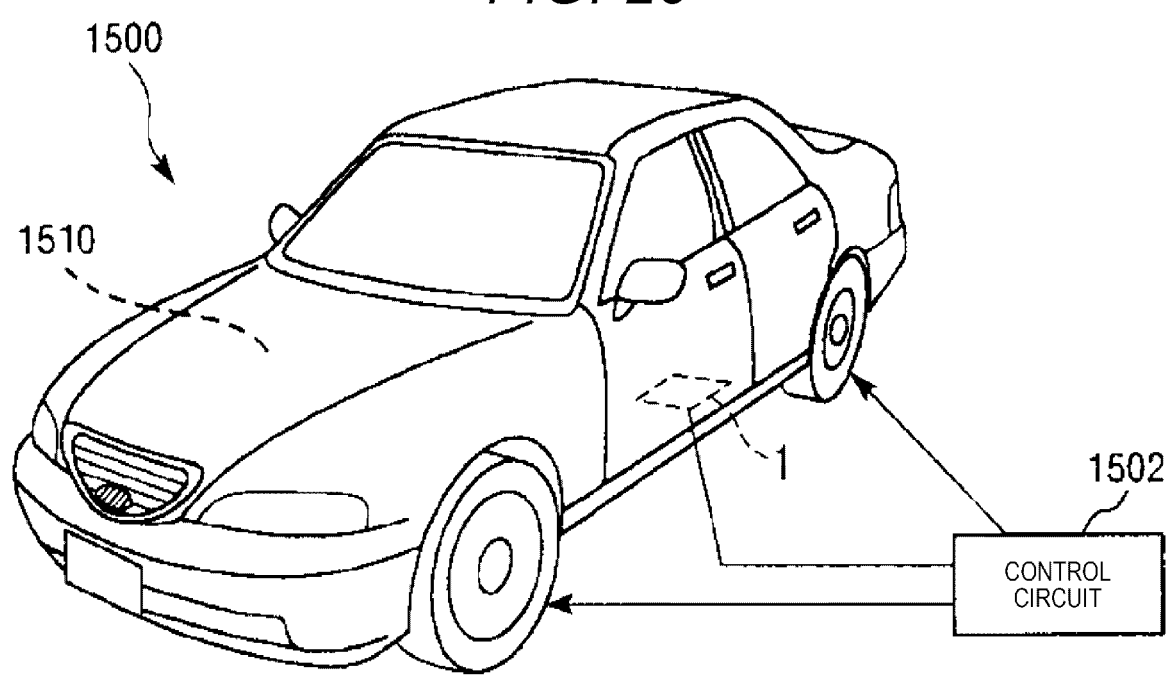
FIG. 20 is a perspective view illustrating a moving object according to a tenth embodiment.

FIG. 20 is a perspective view illustrating a moving object according to a tenth embodiment.

An automobile 1500 as a moving object illustrated in FIG. 20 includes a system 1510 of at least one of an engine system, a brake system, and a keyless entry system, the sensor unit 1, and the control circuit 1502, and can detect a posture of a vehicle body by the sensor unit 1. A detection signal of the sensor unit 1 is supplied to the control circuit 1502, and the control circuit 1502 can control the system 1510 based on the signal.

As described above, the automobile 1500 as a moving object has the sensor unit 1 and the control circuit 1502 which performs a control based on the detection signal output from the sensor unit 1. Therefore, the automobile 1500 can obtain the effect of the sensor unit 1 described above, and can exhibit high reliability.

In addition, the sensor unit 1 is also widely applied to an electronic control unit (ECU) such as a car navigation system, a car air conditioner, an anti-lock brake system (ABS), an airbag, a tire pressure monitoring system (TPMS), an engine control, a battery monitor for a hybrid automobile or an electric automobile. Further, the moving object is not limited to the automobile 1500, and may be applied to, for example, an airplane, a rocket, an artificial satellite, a ship, an automated guided vehicle (AGV), a biped robot, an unmanned airplane such as a drone.

Hereinbefore, a sensor unit, an electronic apparatus, and a moving object according to the present disclosure are described based on the illustrated embodiments, but the present disclosure is not limited thereto and the configuration of each portion can be replaced with any configuration having the same function. Further, any other component may be added to the present disclosure. In addition, each of the embodiments may be appropriately combined.

What is claimed is:

1. A sensor unit comprising:
   a substrate having a first through hole therein;
   an inertial sensor module mounted at the substrate;
   a container including a storage space for storing the substrate and the inertial sensor module, the container having a bottom and a top that are outwardly opposite to each other; and
   a first coupling member that couples between the container and the substrate in a state in which the substrate and the container are in non-contact with each other, wherein
   the first coupling member is configured with a first base and a first protrusion upwardly projecting from the first base, the first protrusion is inserted into the first through hole, and a top surface of the first base contacts the substrate,
   the first coupling member is fixed to only the bottom of the container via the first base,
   the first coupling member has elasticity, and
   an elastic modulus of the first coupling member is smaller than an elastic modulus of the container.

2. The sensor unit according to claim 1, wherein the first coupling member is disposed in a natural state.

3. The sensor unit according to claim 1, wherein the first coupling member is located at an outside area of the inertial sensor module in a plan view.

4. The sensor unit according to claim 1, wherein the first coupling member includes a second protrusion downwardly projecting from the first base, and the first coupling member is fixed to the bottom of the container via the first base and the second protrusion.

5. The sensor unit according to claim 1, further comprising:
   a gel material completely filling the storage space.

6. The sensor unit according to claim 4, wherein the second protrusion is inserted into a hole provided in the bottom of the container.

7. The sensor unit according to claim 6, wherein the first protrusion is loosely fitted into the first through hole, and
   the second protrusion is press-fitted into the hole.

8. The sensor unit according to claim 1, wherein the first coupling member includes a regulation portion that regulates detachment of the substrate from the first protrusion.

9. The sensor unit according to claim 1, further comprising:
   a second coupling member that couples between the container and the substrate; and
   a third coupling member that couples between the container and the substrate,
   wherein the second and third coupling members are fixed to only the bottom of the container.

10. An electronic apparatus comprising:
    the sensor unit according to claim 1, and
    a control circuit that performs a control based on a detection signal output from the sensor unit.

11. A moving object comprising:
    the sensor unit according to claim 1, and
    a control circuit that performs a control based on a detection signal output from the sensor unit.

* * * * *